United States Patent
Verma et al.

(10) Patent No.: US 11,223,507 B2
(45) Date of Patent: Jan. 11, 2022

(54) PAYLOAD WITH SYNCHRONIZATION INFORMATION

(71) Applicant: QUALCOMM Incorporated, San Diego, CA (US)

(72) Inventors: Lochan Verma, San Diego, CA (US); Raja Banerjea, San Jose, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/955,563

(22) Filed: Apr. 17, 2018

(65) Prior Publication Data

US 2018/0302255 A1 Oct. 18, 2018

Related U.S. Application Data

(60) Provisional application No. 62/486,966, filed on Apr. 18, 2017.

(51) Int. Cl.
*H04L 27/26* (2006.01)
*H04W 56/00* (2009.01)
(Continued)

(52) U.S. Cl.
CPC ....... *H04L 27/2613* (2013.01); *H04B 7/2662* (2013.01); *H04L 1/004* (2013.01);
(Continued)

(58) Field of Classification Search
None
See application file for complete search history.

(56) References Cited

U.S. PATENT DOCUMENTS 8,417,190 B2 * 4/2013 Sun .................. H04L 1/1835
455/67.13
8,774,096 B2 * 7/2014 Norair .................. H04L 49/555
370/328
(Continued)

FOREIGN PATENT DOCUMENTS

WO 2011003079 1/2011
WO 2011003084 1/2011

OTHER PUBLICATIONS

Alcatel-Lucent Shanghai Bell., et al., "SYNC Consideration for eMBMS Re19," 3GPP Draft R3-091303_SYNCCONSIDERATION, 3rd Generation Partnership Project (3GPP), Mobile Competence Centre; 650, Route Des Lucioles; F-06921 Sophia-Antipolis Cedex; France, No. San Francisco, USA; Apr. 29, 2009, Apr. 29, 2009, XP050341655, 5 pages, [retrieved on Apr. 29, 2009].

(Continued)

*Primary Examiner* — Gregory B Sefcheck
(74) *Attorney, Agent, or Firm* — Loza & Loza LLP

(57) ABSTRACT

Various aspects of the disclosure relate to communication using a data unit that includes a payload with synchronization information. In some aspects, a first apparatus may transmit a data unit that includes at least one synchronization symbol in the payload. A second apparatus that receives the data unit may thereby recover synchronization information from the data unit even if interference at the second apparatus prevents the second apparatus from recovering synchronization information in a preamble of the data unit. In some aspects, the second apparatus may determine, based on information in the at least one synchronization symbol, whether and/or when to conduct a spatial reuse transmission. In some aspects, the second apparatus may determine, based on information in the at least one synchronization symbol, an amount of time to defer transmission.

17 Claims, 20 Drawing Sheets

(51) Int. Cl.
*H04L 1/00* (2006.01)
*H04B 7/26* (2006.01)
(52) U.S. Cl.
CPC ........ *H04L 1/0006* (2013.01); *H04L 27/2608* (2013.01); *H04L 27/2692* (2013.01); *H04W 56/002* (2013.01); *H04W 56/003* (2013.01)

(56) References Cited

U.S. PATENT DOCUMENTS

| | | | |
|---|---|---|---|
| 8,958,475 B2 | 2/2015 | Raveendran | |
| 9,107,198 B2* | 8/2015 | Sun | H04L 1/1835 |
| 9,112,618 B2 | 8/2015 | Raveendran | |
| 9,379,856 B2* | 6/2016 | Khoryaev | H04W 28/08 |
| 9,398,123 B2* | 7/2016 | Vermani | H04L 69/323 |
| 9,444,672 B2* | 9/2016 | Hui | H04L 27/3405 |
| 9,462,592 B2 | 10/2016 | Kanamarlapudi et al. | |
| 9,609,503 B2* | 3/2017 | Ro | H04W 8/005 |
| 9,838,940 B2* | 12/2017 | Barriac | H04W 40/02 |
| 9,867,230 B2* | 1/2018 | Ro | H04W 8/005 |
| 9,918,195 B2 | 3/2018 | Malik et al. | |
| 9,924,478 B2* | 3/2018 | Seo | H04L 5/0051 |
| 9,930,631 B2* | 3/2018 | Yang | H04W 8/005 |
| 9,967,842 B2* | 5/2018 | Seo | H04W 76/14 |
| 10,142,082 B1* | 11/2018 | Shattil | H04L 27/2613 |
| 10,200,874 B2* | 2/2019 | Sun | H04W 74/0808 |
| 10,285,066 B2* | 5/2019 | Kim | H04W 16/14 |
| 10,292,101 B2* | 5/2019 | Yang | H04L 27/2602 |
| 10,314,063 B2* | 6/2019 | Yoon | H04L 5/0048 |
| 10,420,121 B2* | 9/2019 | Hedayat | H04W 72/12 |
| 10,516,457 B2* | 12/2019 | Wang | H04W 74/0816 |
| 10,523,361 B2* | 12/2019 | Chun | H04L 27/2602 |
| 10,728,765 B2* | 7/2020 | Sun | H04W 74/0808 |
| 2005/0190741 A1* | 9/2005 | Pettersson | H04W 72/0446 370/350 |
| 2006/0268671 A1* | 11/2006 | Coon | H04L 5/0051 370/203 |
| 2009/0034654 A1 | 2/2009 | Inukai et al. | |
| 2012/0020343 A1* | 1/2012 | Sugizaki | H04W 48/17 370/338 |
| 2012/0033620 A1* | 2/2012 | Thoen | H04J 3/0697 370/329 |
| 2013/0107912 A1* | 5/2013 | Ponnampalam | H04L 27/2613 375/147 |
| 2014/0169326 A1 | 6/2014 | Levanen et al. | |
| 2014/0328249 A1* | 11/2014 | Vermani | H04W 28/065 370/328 |
| 2016/0043781 A1* | 2/2016 | Cho | H04L 5/0051 342/373 |
| 2016/0197755 A1 | 7/2016 | Barriac et al. | |
| 2016/0330059 A1* | 11/2016 | Eitan | H04L 27/2647 |
| 2018/0139787 A1* | 5/2018 | Islam | H04W 48/16 |
| 2018/0352499 A1* | 12/2018 | Khoury | H04L 69/08 |

OTHER PUBLICATIONS

Chuprun S., et al., "Preamble and Embedded Synchronization for RF Carrier Frequency-Hopped OFDM," IEEE Journal on Selected Areas in Communications, IEEE Service Center, Piscataway, US, vol. 23 (5), May 1, 2005, pp. 920-931, XP011131233.
International Search Report and Written Opinion—PCT/US2018/028158—ISA/EPO—dated Jul. 23, 2018.

* cited by examiner

PAYLOAD WITH SYNCHRONIZATION INFORMATION

CROSS-REFERENCE TO RELATED APPLICATION(S)

This application claims priority to and the benefit of provisional patent application No. 62/486,966 filed in the U.S. Patent and Trademark Office on Apr. 18, 2017, the entire content of which is incorporated herein by reference.

INTRODUCTION

Various aspects described herein relate to wireless communication and, more particularly but not exclusively, to communication using a data unit that includes a payload with synchronization information.

Wireless communication networks are widely deployed to provide various communication services such as telephony, video, data, messaging, broadcasts, and so on. Such networks, which are usually multiple access networks, support communications for multiple users by sharing the available network resources.

Within such wireless networks a variety of data services may be provided, including voice, video, and emails. More recently, wireless communication networks are being utilized for an even broader range of services and larger numbers of users. As the demand for mobile broadband access continues to increase, research and development continue to advance wireless communication technologies not only to meet the growing demand for mobile broadband access, but to advance and enhance the user experience.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication. The apparatus includes: a processing system configured to generate first synchronization information, generate second synchronization information including at least one indication of whether spatial reuse is allowed, and generate a data unit comprising a preamble and a payload, wherein the preamble includes the first synchronization information and the payload includes the second synchronization information; and an interface configured to output the data unit for transmission.

In some aspects, the disclosure provides a method for communication including: generating first synchronization information; generating second synchronization information including at least one indication of whether spatial reuse is allowed; generating a data unit comprising a preamble and a payload, wherein the preamble includes the first synchronization information and the payload includes the second synchronization information; and outputting the data unit for transmission.

In some aspects, the disclosure provides an apparatus configured for communication. The apparatus includes: means for generating first synchronization information and second synchronization information including at least one indication of whether spatial reuse is allowed; means for generating a data unit comprising a preamble and a payload, wherein the preamble includes the first synchronization information and the payload includes the second synchronization information; and means for outputting the data unit for transmission.

In some aspects, the disclosure provides a wireless node. The wireless node includes: a processing system configured to generate first synchronization information, generate second synchronization information including at least one indication of whether spatial reuse is allowed, and generate a data unit comprising a preamble and a payload, wherein the preamble includes the first synchronization information and the payload includes the second synchronization information; and a transmitter configured to transmit the data unit.

In some aspects, the disclosure provides a computer-readable medium (e.g., a non-transitory computer-readable medium) storing computer-executable code, including code to: generate first synchronization information; generate second synchronization information including at least one indication of whether spatial reuse is allowed; generate a data unit comprising a preamble and a payload, wherein the preamble includes the first synchronization information and the payload includes the second synchronization information; and output the data unit for transmission.

In some aspects, the disclosure provides an apparatus configured for communication. The apparatus includes: an interface configured to obtain a data unit comprising a preamble and a payload, wherein the preamble includes first synchronization information and the payload includes second synchronization information including at least one indication of whether spatial reuse is allowed; and a processing system configured to detect the second synchronization information, and manage a transmission, wherein the management of the transmission is based on the detected second synchronization information.

In some aspects, the disclosure provides a method for communication including: obtaining a data unit comprising a preamble and a payload, wherein the preamble includes first synchronization information and the payload includes second synchronization information including at least one indication of whether spatial reuse is allowed; detecting the second synchronization information; and managing a transmission, wherein the management of the transmission is based on the detected second synchronization information.

In some aspects, the disclosure provides an apparatus configured for communication. The apparatus includes: means for obtaining a data unit comprising a preamble and a payload, wherein the preamble includes first synchronization information and the payload includes second synchronization information including at least one indication of whether spatial reuse is allowed; means for detecting the second synchronization information; and means for managing a transmission, wherein the management of the transmission is based on the detected second synchronization information.

In some aspects, the disclosure provides a wireless node. The wireless node includes: a receiver configured to receive a data unit comprising a preamble and a payload, wherein the preamble includes first synchronization information and the payload includes second synchronization information including at least one indication of whether spatial reuse is allowed; and a processing system configured to detect the second synchronization information, and manage a transmission, wherein the management of the transmission is based on the detected second synchronization information.

In some aspects, the disclosure provides a computer-readable medium (e.g., a non-transitory computer-readable medium) storing computer-executable code, including code to: obtain a data unit comprising a preamble and a payload, wherein the preamble includes first synchronization information and the payload includes second synchronization information including at least one indication of whether spatial reuse is allowed; detect the second synchronization information; and manage a transmission, wherein the management of the transmission is based on the detected second synchronization information.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of communication includes generating first synchronization information; generating second synchronization information including at least one indication of whether spatial reuse is allowed; generating a data unit comprising a preamble and a payload, wherein the preamble includes the first synchronization information and the payload includes the second synchronization information; and outputting the data unit for transmission.

The concepts described herein may be used in an IEEE 802.11-based network (also referred to as a Wi-Fi network), for example, future revisions of the 802.11ax standard or to be developed Wi-Fi standards, or may be used in other types of wireless communication systems. For purposes of illustration, the following may describe various aspects in the context of a Wi-Fi network. It should be appreciated, however, that the teachings herein may be used in other systems as well. Thus, references to functionality in the context of Wi-Fi network terminology should be understood to be equally applicable to other types of technology, networks, components, signaling, and so on.

Example Wi-Fi Network

The disclosure relates in some aspects to signal detection in Wi-Fi networks. Some aspects of the disclosure may be particularly applicable to signal detection in densely populated Wi-Fi networks. The use of Wi-Fi networks is proliferating. Moreover, the typical density of Wi-Fi networks deployed over a given area is increasing as well.

In a Wi-Fi network, a client (e.g., a STA) receives signals from its own basic service set (BSS) and from multiple overlapping BSSs (OBSSs). Thus signals from an OBSS may interfere with a client's reception of signals from its BSS.

Figure 1:
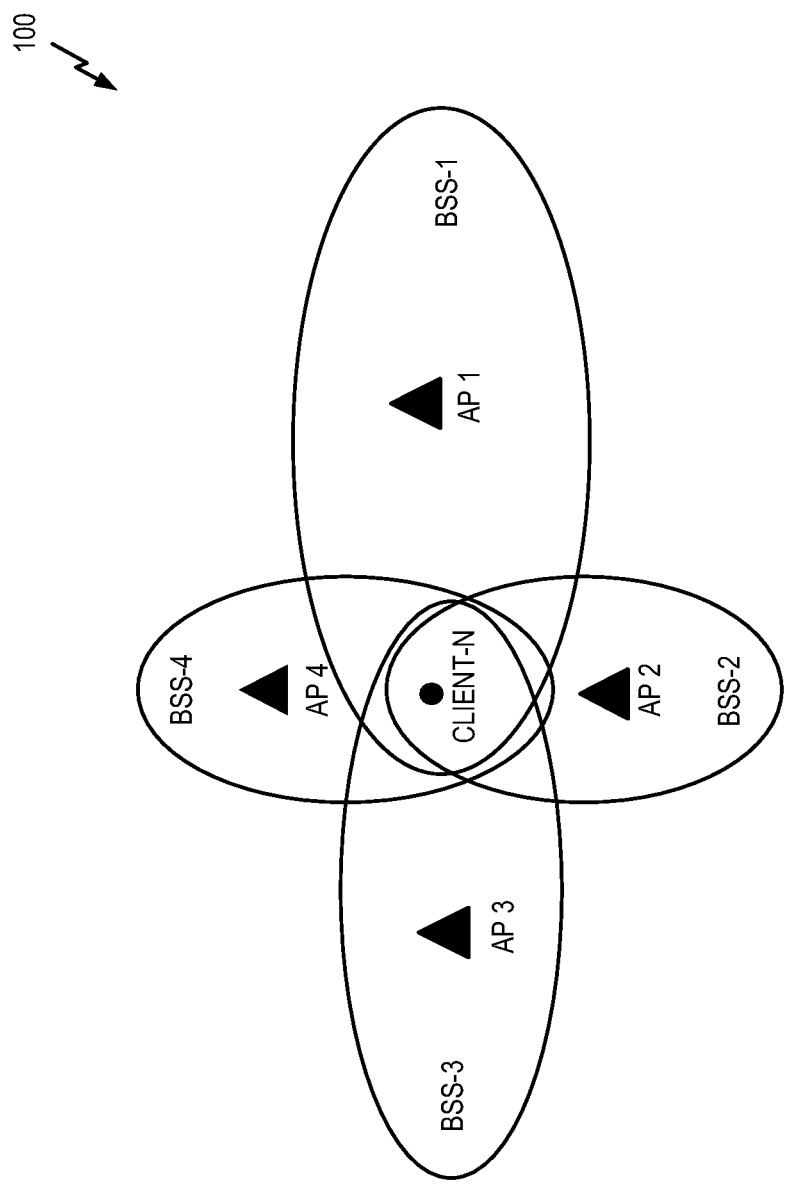
FIG. 1 illustrates an example of a wireless communication system including basis service sets.

For example, FIG. 1 illustrates a wireless communication system 100 that includes four access points (a first access point AP 1, a second access point AP 2, a third access point AP 3, and a fourth access point AP 4) operating on the same primary 20 MHz channel. The access points (APs) are hidden from each other in that the APs cannot hear each other's transmissions.

A client, designated client-N, belongs to (e.g., is currently served by) a first basic service set BSS-1 of the first access point AP 1 and also receives transmissions from the second access point AP 2, the third access point AP 3, and the fourth access point AP 4. Consequently, the client (client-N) may receive overlapping signals (e.g., interfering signals) from a second basic service set BSS-2 of the second access point AP 2, a third basic service set BSS-3 of the third access point AP 3, and a fourth basic service set BSS-4 of the fourth access point AP 4.

In this case, incoming signal collision may interfere with proper operation of signal detect (SD) at the client. Normally, the client may use a signal detect (SD) operation to detect synchronization information and channel estimation information carried by a preamble of a received signal (e.g., a data unit such as a frame). If interference prevents accurate detection of the preamble, however, the client may default to an energy detect (ED) operation. That is, the client may be forced to execute an ED operation in lieu of an SD operation due to collisions of preambles.

An ED operation involves measuring received signal strength and determining whether the signal strength is higher than a threshold (e.g., an ED_Threshold). If so, the clear channel assessment (CCA) indicates that the corresponding medium is BUSY, and the client defers (e.g., delays) its transmissions. For an ED operation, the client does not know the duration of the ongoing transmission. Consequently, the client does not know how long it should defer its own transmission due to the CCA Busy status of the medium.

The above issues may be particularly problematic in a dense Wi-Fi network deployment. For example, a client won't know exactly what duration to defer its transmissions. Alternatively, or in addition, a client won't know the duration to use for its reuse transmissions. Moreover, to determine whether the CCA indicates BUSY or IDLE, a client may expend power to continuously execute an ED operation. Consequently, the client may keep its analog front end (AFE) active. In view of the above, other BSS (OBSS) interference may negatively impact a client's throughput and result in an increase in power consumption.

Payload With Synchronization Information

The disclosure relates in some aspects to embedding synchronization (SYNC) symbols in the payload of a data unit (e.g., a frame). These SYNC symbols provide a reoccurring opportunity for a client to correctly detect a received signal even if the client is unable to correctly detect the preamble of the received signal. Consequently, a client will be able to determine the CCA correctly since it can perform an SD operation based on a payload SYNC symbol rather than revert to an ED operation. Moreover, a client can determine the interference Color (OBSS Color) and/or determine whether to conduct an overlapping transmission (e.g., reuse) for the duration determined from the SD operation based on a payload SYNC symbol.

Example Data Unit

Figure 2:
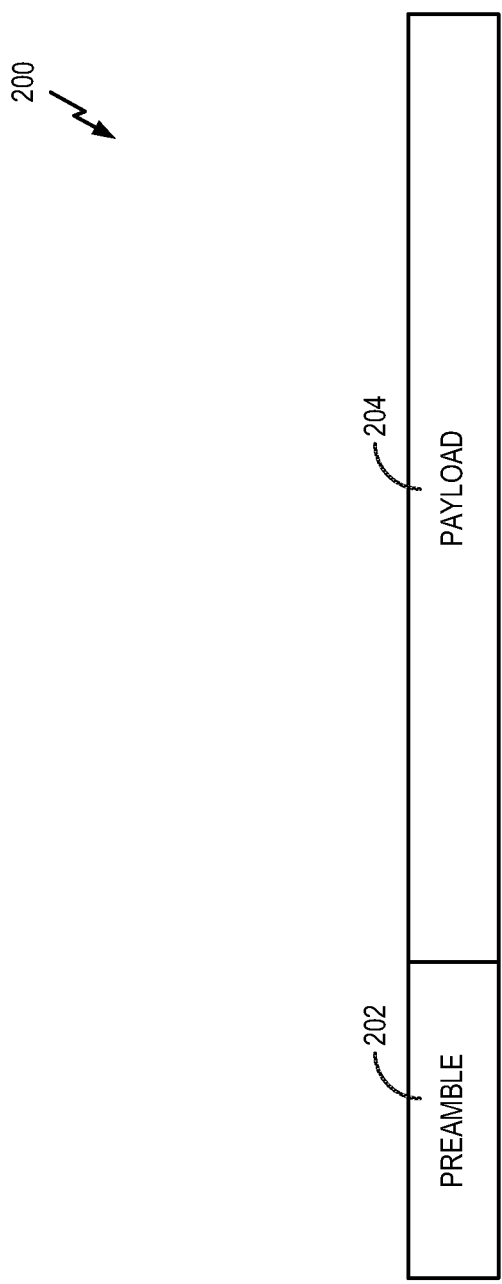
FIG. 2 illustrates an example of a data unit for wireless communication in accordance with some aspects of the disclosure.

The disclosure relates in some aspects to communication using a data unit that includes a payload with synchronization information. For example, FIG. 2 illustrates a data unit 200 that includes a preamble 202 and a payload 204. As discussed in more detail below, the preamble includes synchronization information and channel estimation information, while the payload includes data and synchronization information.

A data unit may take different forms in different implementations. In some aspects, a data unit may be a frame for wireless communication. In some aspects, a data unit may be a Physical Layer Convergence Protocol (PLCP) Protocol Data Unit (PPDU) for Wi-Fi communication. In some aspects, a data unit may be an IEEE 802.11 frame (e.g., an IEEE 802.11ax frame, an IEEE 802.11ax frame, etc.). Other examples of data units for wireless communication are possible.

Example Wireless Communication System

Figure 3:
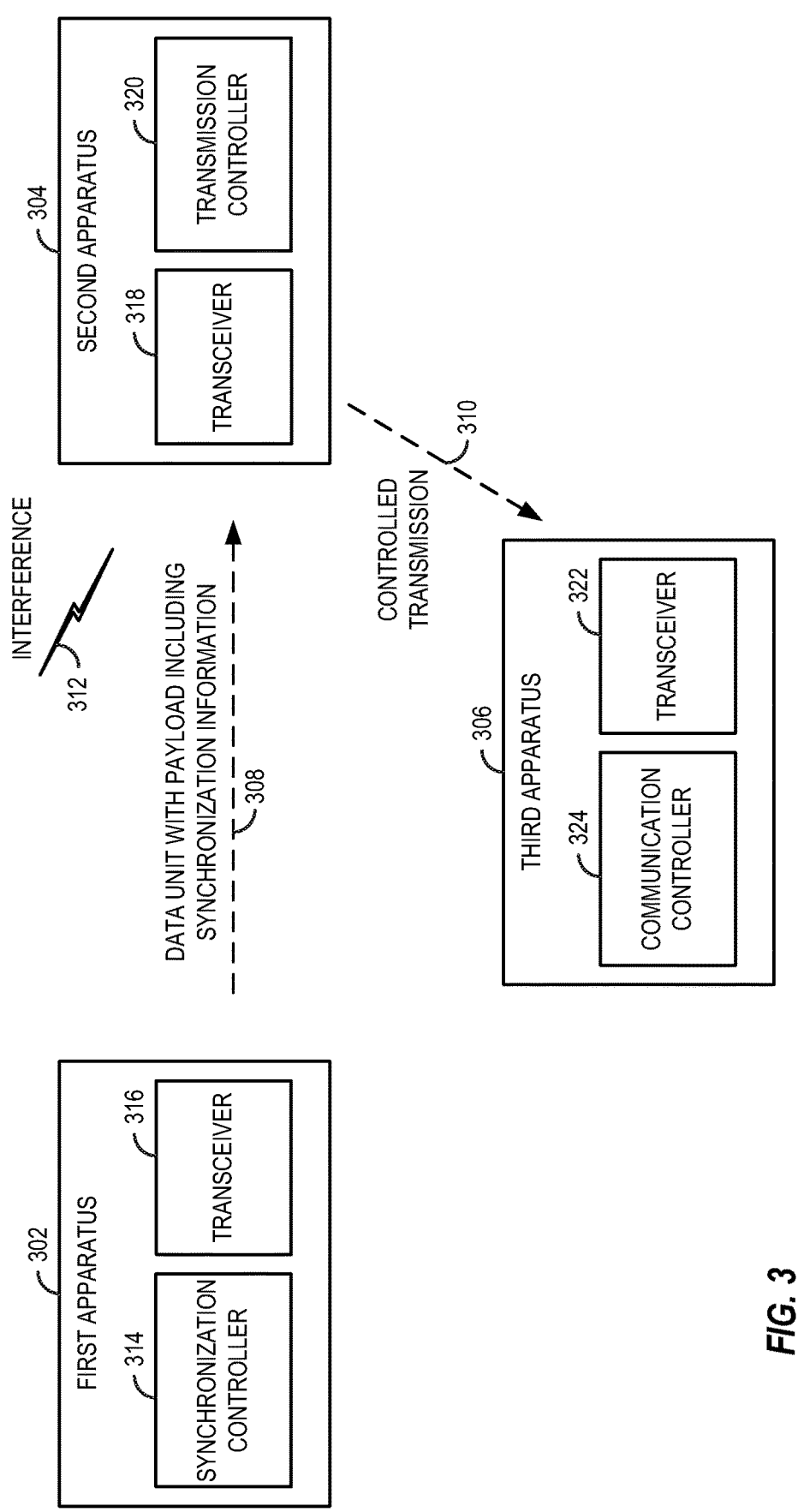
FIG. 3 illustrates an example of a wireless communication system in which aspects of the present disclosure may be employed.

FIG. 3 illustrates a wireless communication system 300 that includes a first apparatus 302, a second apparatus 304, and a third apparatus 306. In practice, a wireless communication system in accordance with the teachings herein may include a different number of apparatuses.

The first apparatus 302 transmits a data unit 308 (represented by a dashed arrow in FIG. 3) with a payload that includes synchronization information in accordance with the teachings herein. As discussed in more detail below, this allows the second apparatus 304 to control its transmission 310 (represented by a dashed arrow in FIG. 3) to the third apparatus 306 even if the second apparatus 304 is subjected to interference 312 that prevents the second apparatus 304 from correctly detecting the preamble of the data unit 308.

To this end, a synchronization controller 314 of the first apparatus 302 generates the data unit 308 with a payload that includes synchronization information. For example, the synchronization controller 314 may generate a data unit that includes at least one synchronization symbol in the payload, whereby a transceiver 316 of the first apparatus 302 transmits the data unit 308 (e.g., to another apparatus, not shown in FIG. 3).

In cases where a transceiver 318 of the second apparatus is able to receive the data unit 308 (e.g., the transceiver 318 receives OBSS signals from the first apparatus 302), a transmission controller 320 of the second apparatus 304 may detect the synchronization information in the data unit 308 in scenarios where the second apparatus 304 is unable to correctly detect the preamble of the data unit 308. That is, upon receiving the data unit 308, the second apparatus 304 may recover synchronization information from the data unit 308 even if interference at the second apparatus 304 prevents the second apparatus 304 from recovering synchronization information in a preamble of the data unit 308.

This allows the transmission controller 320 to control the transmission 310. For example, the second apparatus 304 (e.g., the transmission controller 320) may determine, based on information in at least one synchronization symbol of the payload of the data unit 308, whether and/or when to conduct a spatial reuse transmission. As another example, the second apparatus 304 (e.g., the transmission controller 320) may determine, based on information in the at least one synchronization symbol, an amount of time to defer transmission.

The third apparatus 306 includes a transceiver 322 and a communication controller 324 for receiving the transmission 310 and for performing other communication operations. For example, the communication controller 324 may include functionality similar to the synchronization controller 314 and/or the transmission controller 320. The first apparatus 302 and/or the second apparatus 304 may include functionality similar to the communication controller 324 as well.

Comparison of Example Data Units

Figure 4:
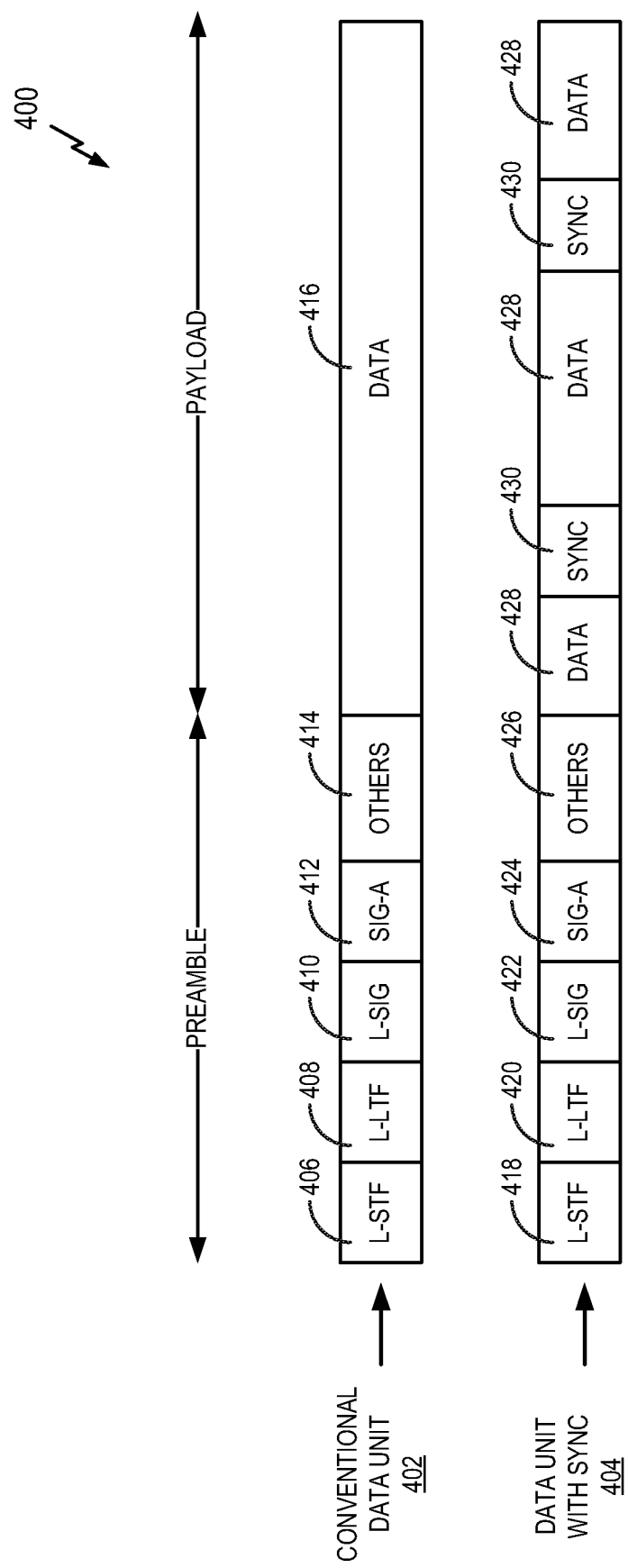
FIG. 4 illustrates an example of a conventional data unit compared with an example of a data unit constructed in accordance with some aspects of the disclosure.

FIG. 4 illustrates an example of a conventional data unit 402 compared with an example of a data unit 404 in accordance with some aspects of the disclosure. As discussed below, the data unit 404 may include at least one SYNC symbol in the payload.

The preamble of the data unit 402 includes a legacy short training field (L-STF) 406, a legacy long training field (L-LTF) 408, a legacy signal field (L-SIG) 410, a signal field A (SIG-A) 412, and other fields 414. The payload of the data unit 402 includes a data field 416.

The preamble of the data unit 404 includes an L-STF 418 field, an L-LTF field 420, an L-SIG field 422, a SIG-A field 424, and other fields 426. The payload of the data unit 404 includes data fields 428 and SYNC fields 430.

In a "conventional" signal, when a legacy short training field (L-STF) is input to an SD Module, one of the outputs of interest is a timing determination (e.g., a time epoch at which the L-STF sequence ends). The legacy long training field (L-LTF), the legacy signal fields (L-SIG/SIG-A), and other fields can be correctly decoded in this case and all characteristics of the transmission are known. However, there is only one opportunity to successfully execute the SD Module since there is only one L-STF in the "conventional" signal.

In contrast, including SYNC information in the payload may provide reoccurring opportunities to successfully execute the SD Module since there may be more than one L-STF in the "data unit with SYNC" signal. Thus, there may be more than one opportunity to determine the characteristics of the ongoing transmission. Advantageously, this may provide opportunities for spatial reuse transmissions by providing reoccurring opportunities for determining the characteristics of the ongoing transmission.

Example Identification of Synchronization Symbol

Figure 5:
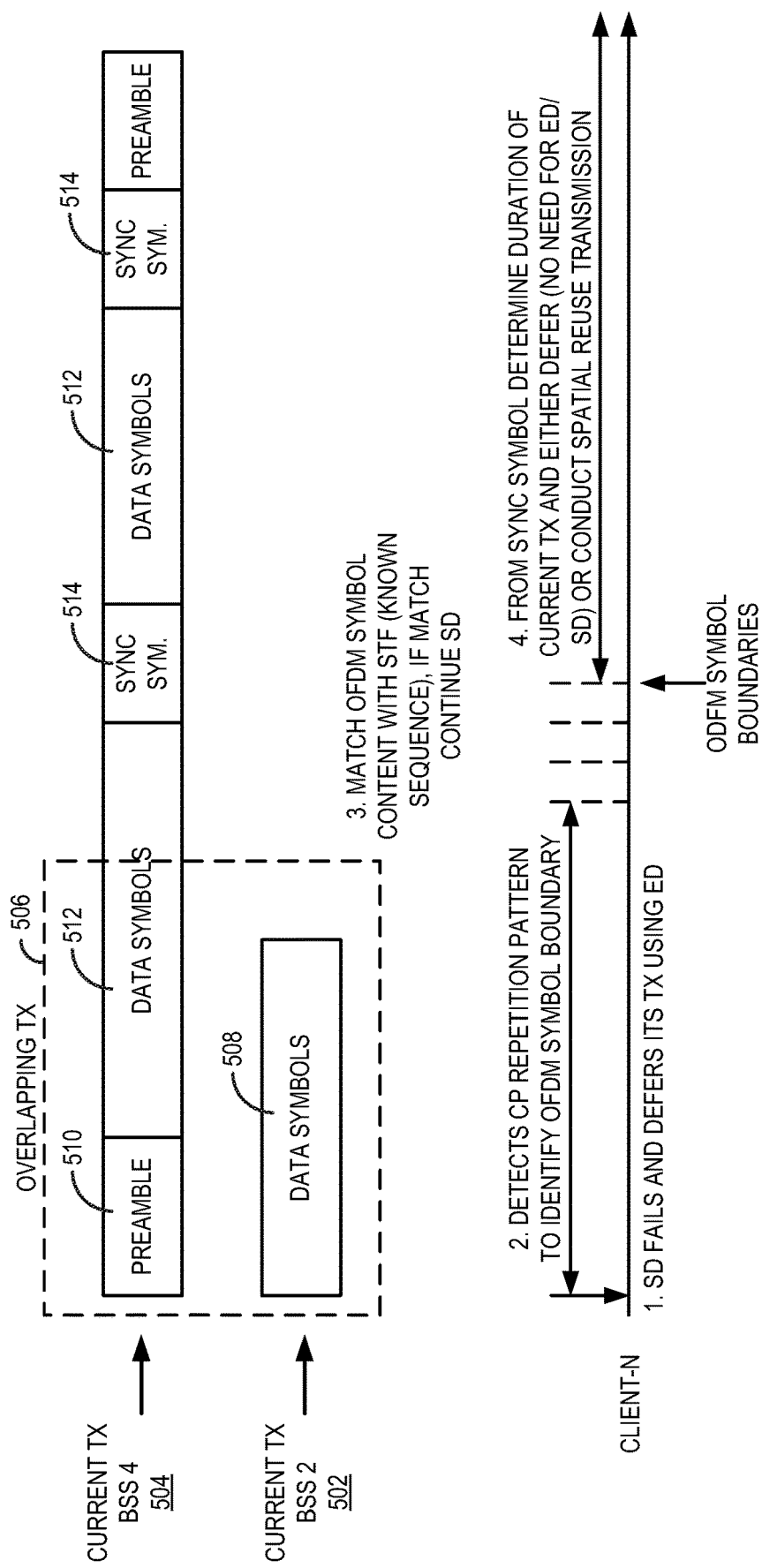
FIG. 5 illustrates an example of identification of a synchronization symbol in accordance with some aspects of the disclosure.

FIG. 5 illustrates an example of identification of a synchronization symbol in accordance with some aspects of the disclosure. As indicated, a first transmission 502 from a first basic service set BSS 2 and a second transmission 504 from a second basic service set BSS 4 overlap 506 at least to some extent. Specifically, data symbols 508 of the first transmission 502 are sent at the same time as a preamble 510 and some of the data symbols 512 of the second transmission 504.

Due to this overlap, at step 1, an SD operation at the client (client-N) fails, and the client defers its transmission based on an ED operation. At step 2, the client detects a cyclic prefix (CP) repetition pattern of the orthogonal frequency division multiplexing (OFDM) symbols. This allows the client to identify an OFDM symbol boundary. At step 3, the client matches the received OFDM symbol content with a known short training field (STF) sequence. If there is an STF match, the client can perform an SD operation. At step 4, as discussed in more detail below, from a SYNC symbol 514, the client can determine the duration of the current transmission and either defer or do a spatial reuse transmission.

Example IEEE 802.11 Data Unit

Figure 6:
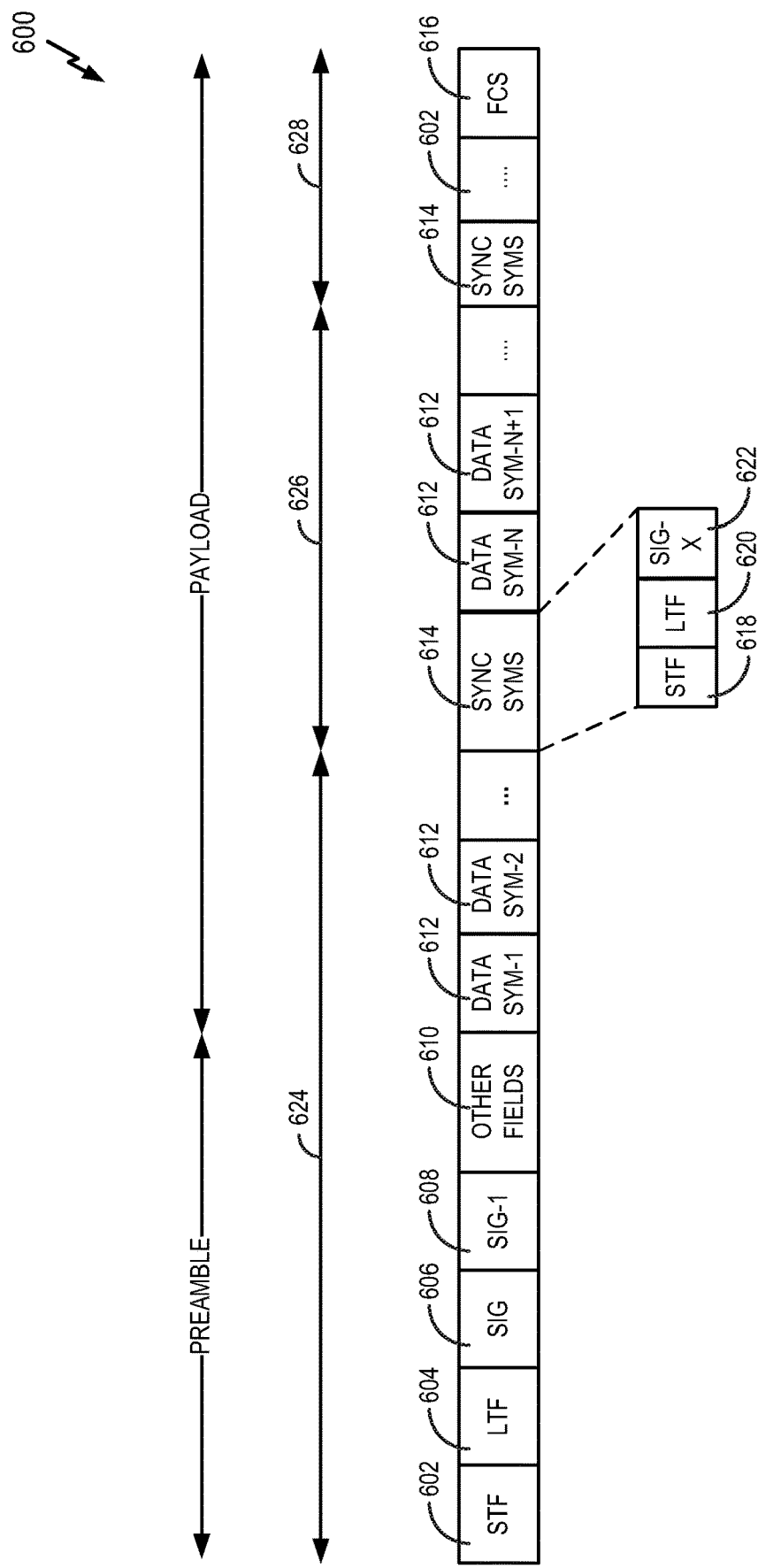
FIG. 6 illustrates an example of a data unit that includes synchronization symbols in accordance with some aspects of the disclosure.

FIG. 6 illustrates an example of an IEEE 802.11 Physical Layer Convergence Protocol (PLCP) Protocol Data Unit (PPDU) 600 that includes synchronization symbols in accordance with some aspects of the disclosure. The preamble of the PPDU 600 includes an STF field 602, an LTF field 604, a SIG field 606, a SIG-1 field 608, and other fields 610. The payload of the PPDU 600 includes data fields 612 (containing a series of data symbols), SYNC fields 614 (each containing at least one SYNC symbol), and a frame check sequence (FCS) 616. The STF field 602 may be used for signal detection, automatic gain control (AGC) calibration, and synchronization of frequency and/or time. The LTF field 604 may be used for channel estimation. The SIG field 606 may indicate the duration of the PPDU 600. The SIG-1 field 608 and the other fields 610 may include information such as BSS Color, modulation and coding scheme (MCS), guard interval (GI), LTF, etc.

As shown, a SYNC field 614 may include an STF field 618 and an LTF field 620 similar to the preamble. The STF field 618 and the LTF field may be used for re-calibration and/or for a second or subsequent chance to detect the PPDU 600.

In addition, the SYNC field may include a signal-x (SIG-X) field 622 that includes information from the signal fields (e.g., the SIG field 606 and the SIG-1 field 608) of the preamble. For example, the SIG-X field 622 may include an indication of the duration of the PPDU, an indication of whether spatial reuse is allowed, a BSS Color indication, guard interval (GI) information, modulation and coding scheme (MSC) information, other information, or any combination thereof. This information may enable a client to determine whether and/or how to defer to the transmission of the PPDU 600. In some cases, the SIG-X field 622 may include a subset of the information from the SIG field 606, the SIG-1 field 608, and other fields. In other cases, the SIG-X field 622 may include all of the information from these fields.

During a first time period 624, a client may be unable to detect and/or decode the preamble due to OBSS interference. In other words, this interference may cause the client's SD operation to fail. As a result, the client may conduct an ED operation. If energy is detected by the ED operation, the client may refrain from conducting an overlapping transmission (e.g., a reuse transmission) to avoid interfering with a pending transmission by another device.

During a second time period 626, the client has a second chance to detect and decode the preamble. In this case, if an SD operation is succeeds, based on the information in a SYNC symbol, the client may determine the duration of the detected transmission, may determine the BSS color of the detected transmission, and may conduct an overlapping transmission (e.g., a reuse transmission).

During a third time period 628, the client has a second chance to detect and decode the preamble. For example, if the client unable to detect and/or decode the preamble during the second time period 626, the client may reattempt the detection and decoding operations (e.g., an SD operation).

In some aspects, coding may be continuous across SYNC symbols. For example, at least a portion of the SYNC symbols may be encoded as part of the payload.

Example IEEE 802.11ax Data Unit

Figure 7:
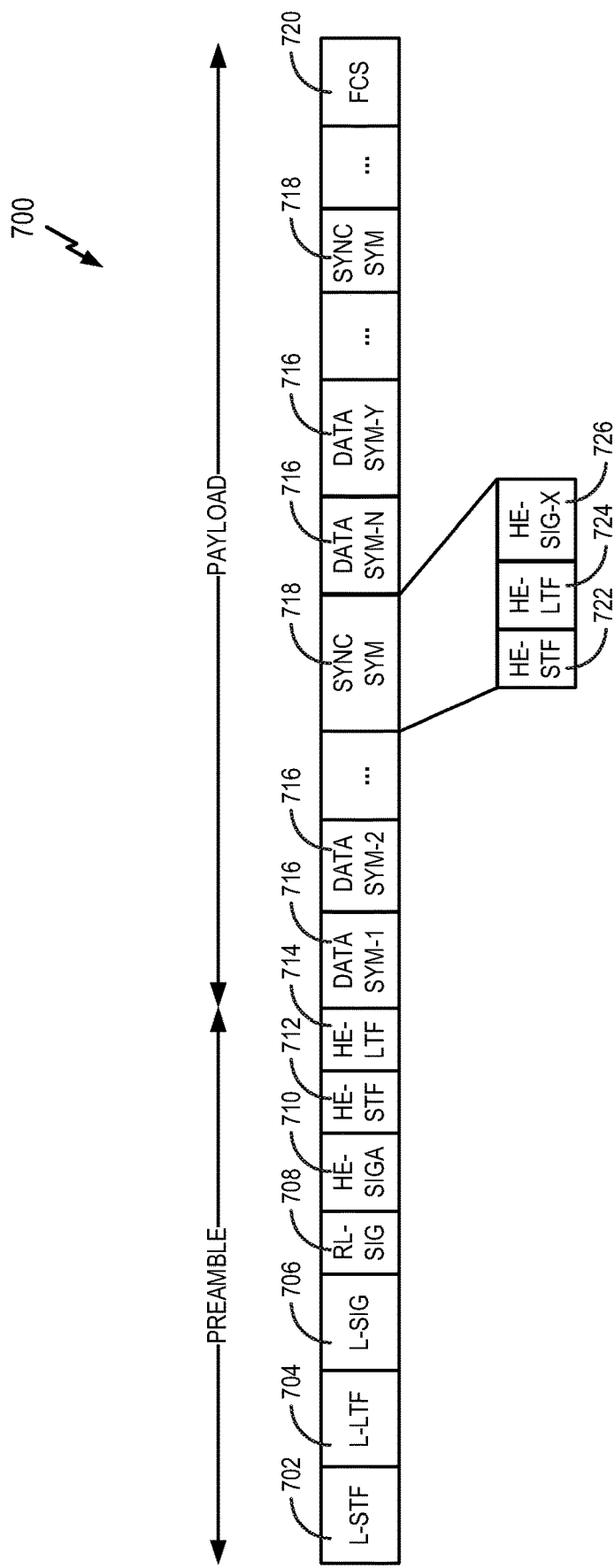
FIG. 7 illustrates another example of a data unit that includes synchronization symbols in accordance with some aspects of the disclosure.

FIG. 7 illustrates an example of an IEEE 802.11ax data unit 700 that includes synchronization symbols in accordance with some aspects of the disclosure. The preamble of the data unit 700 includes a L-STF field 702, an L-LTF field 704, an L-SIG field 706, an RL-SIG field 708, a high efficiency SIG-A (HE-SIGA) field 710, an HE-STF field 712, and an HE-LTF field 714. The payload of the data unit 700 includes data fields 716 (containing a series of data symbols), SYNC fields 718 (each containing at least one SYNC symbol), and a frame check sequence (FCS) 720.

As indicated, a SYNC field 718 may include: at least one STF field 722, at least one LTF field 724, and at least one SIG-X (Signal-X) field 726. The STF/LTF is used for synchronization and channel estimation. SIG-X may be an OFDM symbol (e.g., 4 µs long in 802.11ac; 16 µs long in 802.11ax) in Wi-Fi, or some other value. SIG-X may carry a subset of the information present in SIG-A and other fields in the Preamble and may be of a defined size (e.g., 26 bits). For example, SIG-X may include BSS Color information, MCS information, GI information, a LTF, a Spatial Reuse Allowed flag, etc. SIG-X may also include a SYNC symbol Identifier (e.g., 1 bit) to identify a SYNC symbol.

SIG-X may be transmitted at same MCS as the payload in some scenarios. In this case, the number of bits in SIG-X may vary (e.g., unused bits are reserved).

Multiple SIG-X symbols (e.g., 2) may be added to the SYNC SYM to carry more information. However, this would add to the overhead.

Example Decoding of Synchronization Information

Figure 8:
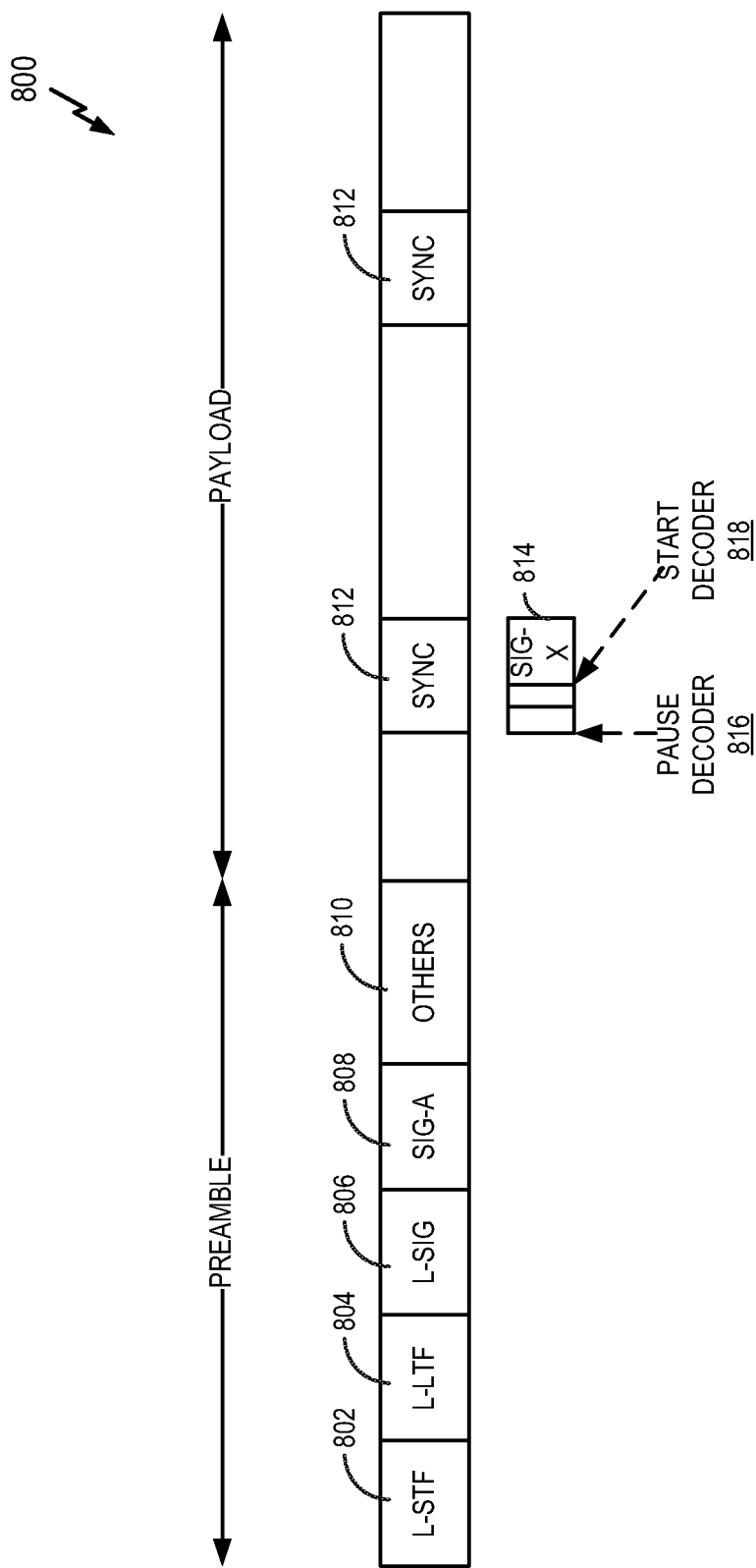
FIG. 8 illustrates an example of decoding a data unit that includes synchronization symbols in accordance with some aspects of the disclosure.

FIG. 8 illustrates an example of decoding a data unit 800 that includes synchronization symbols in accordance with some aspects of the disclosure. The preamble of the data unit 800 includes an L-STF field 802, an L-LTF field 804, an L-SIG field 806, a SIG-A field 808, and other fields 810. The payload of the data unit 800 includes SYNC fields 812 interspersed within data fields.

As mentioned above, coding may be continuous across SYNC symbols. In an example implementation, the L-STF and the L-LTF are not coded. That is, these fields do not go through the encoder (e.g., a BCC encoder). However, SIG-X 814 may be encoded as part of payload. Thus, at a receiver, the decoder may be paused 816 for a first portion of a SYNC field 812 and then started 818 to decode SIG-X 814. In some cases, SIG-X 814 may be encoded using the same MCS as the payload.

In some cases, coding may be discontinuous across SYNC symbols. For example, SIG-X 814 may be encoded using a different MCS than is used for encoding the payload (E.g., DBPSK and ½ code rate). In this case, the SYNC symbol may be a more robust transmission, with a tradeoff in implementation complexity.

Other Aspects

In view of the above, the disclosure relates in some aspects to a SYNC symbol for signal detection and assistance in spatial reuse transmission. In addition, the disclosure relates in some aspects to a SYNC symbol for signal detection and deferring transmission based on knowledge of the duration of an ongoing transmission. In some aspects, this may reduce power during a power save mode of operation. The disclosure also relates in some aspects to the disclosed structure of a SYNC symbol. Furthermore, the disclosure relates in some aspects to detection of a SYNC symbol.

In some aspects, SD and ED modules may be running in parallel, processing whatever signal information is being received. If the SD module is not providing an output (e.g., due to interference) and the ED module is providing an output, this means that only energy is being detected, i.e., the current signal is not being detected. In this case, the use of synchronization information in the payload may provide reoccurring opportunities to do signal detect on the same signal.

Wireless Communication Examples

The teachings herein may be implemented using various wireless technologies and/or various spectra. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_t$) transmit antennas and multiple ($N_r$) receive antennas for data transmission. A MIMO channel formed by the $N_t$ transmit and $N_r$ receive antennas may be decomposed into $N_s$ independent channels, which are also referred to as spatial channels or streams, where $N_s \leq \min\{N_t, N_r\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points ("APs") and clients (also referred to as stations, or "STAs"). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point ("AP") may also include, be implemented as, or known as a Transmit Receive Point (TRP), a NodeB (NB), an eNodeB (eNB), a gNodeB (gNB), a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or reference using some other suitable terminology.

A station "STA" may also include, be implemented as, or known as an access terminal ("AT"), a subscriber station, a subscriber unit, a mobile station, a remote station, a remote terminal, a user terminal, a user agent, a user device, user equipment, a client, a mobile, a mobile node, or referenced using some other suitable terminology. In some implementations, a STA may include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may include a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes). In some aspects, an apparatus (e.g., a wireless apparatus) implemented in accordance with the teachings herein may include an access point, a relay, or an access terminal.

A relay may include, be implemented as, or known as a relay node, a relay device, a relay station, a relay apparatus, or some other similar terminology. As discussed above, in some aspects, a relay may include some access terminal functionality and some access point functionality.

In some aspects, a wireless apparatus may include an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "$3^{rd}$ Generation Partnership Project" (3GPP), while cdma2000 is described in documents from an organization named "$3^{rd}$ Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1×RTT, 1×EV-DO Re10, RevA, RevB) technology and other technologies.

Example Beamforming System

Figure 9:
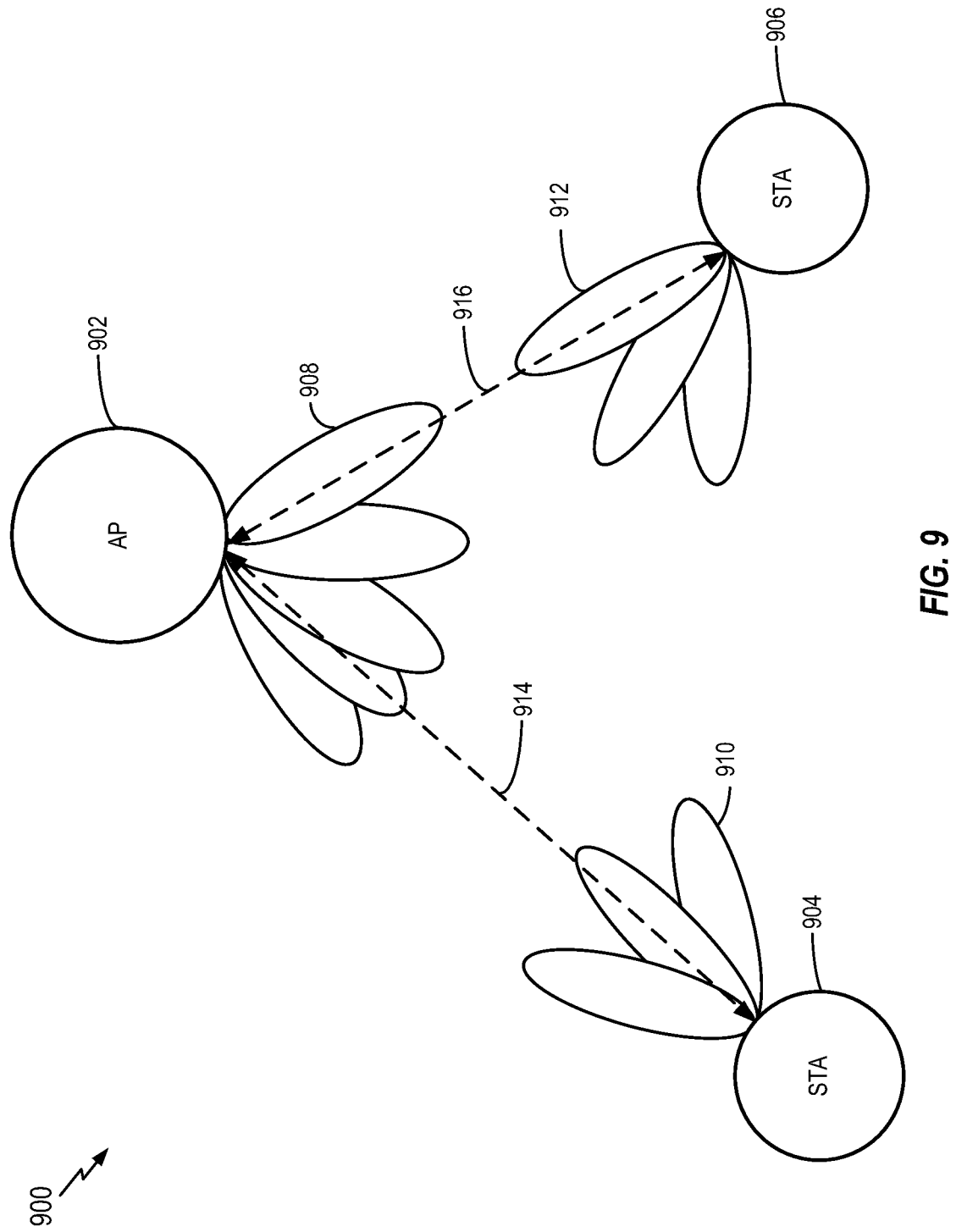
FIG. 9 illustrates another example of a wireless communication system in which aspects of the present disclosure may be employed.

FIG. 9 illustrates a communication system 900 where an access point (AP) 902 communicates with a first STA 904 and a second STA 906 via different beamforming directions. As indicated by a set of beams 908, the AP 902 may communicate via any one of a plural of directional beams. As indicated by a set of beams 910, the first STA 904 may communicate via any one of a plural of directional beams. As indicated by a set of beams 912, the second STA 906 may communicate via any one of a plural of directional beams. For example, the AP 902 may communicate with the first STA 904 via a first beamforming direction 914 and communicate with the second STA 906 via a second beamforming direction 916.

A wireless MIMO system may use multiple transmit antennas to provide beamforming-based signal transmission. Typically, beamforming-based signals transmitted from different antennas are adjusted in phase (and optionally amplitude) such that the resulting signal power is focused toward a receiver device (e.g., an access terminal).

A wireless MIMO system may support communication for a single user at a time or for several users concurrently. Transmissions to a single user (e.g., a single receiver device) are commonly referred to as single-user MIMO (SU-MIMO), while concurrent transmissions to multiple users are commonly referred to as multi-user MIMO (MU-MIMO).

MIMO may be used in a wireless local area network (WLAN) that supports IEEE 802.11ax or some other 802.11-based standard. An AP (e.g., a base station) of an 802.11-based MIMO system employs multiple antennas for data transmission and reception, while each user station (STA) employs one or more antennas. The AP communicates with the STAs via forward link channels and reverse link channels. In some aspects, a downlink (DL) channel refers to a communication channel from a transmit antenna of the access point to a receive antenna of a STA, and an uplink (UL) channel refers to a communication channel from a transmit antenna of a STA to a receive antenna of the AP. Downlink and uplink may be referred to as forward link and reverse link, respectively.

MIMO channels corresponding to transmissions from a set of transmit antennas to a receive antenna are referred to spatial streams since precoding (e.g., beamforming) is employed to direct the transmissions toward the receive antenna. Consequently, in some aspects each spatial stream corresponds to at least one dimension. A MIMO system thus provides improved performance (e.g., higher throughput and/or greater reliability) through the use of the additional dimensionalities provided by these spatial streams.

Example Wireless Communication System

Figure 10:
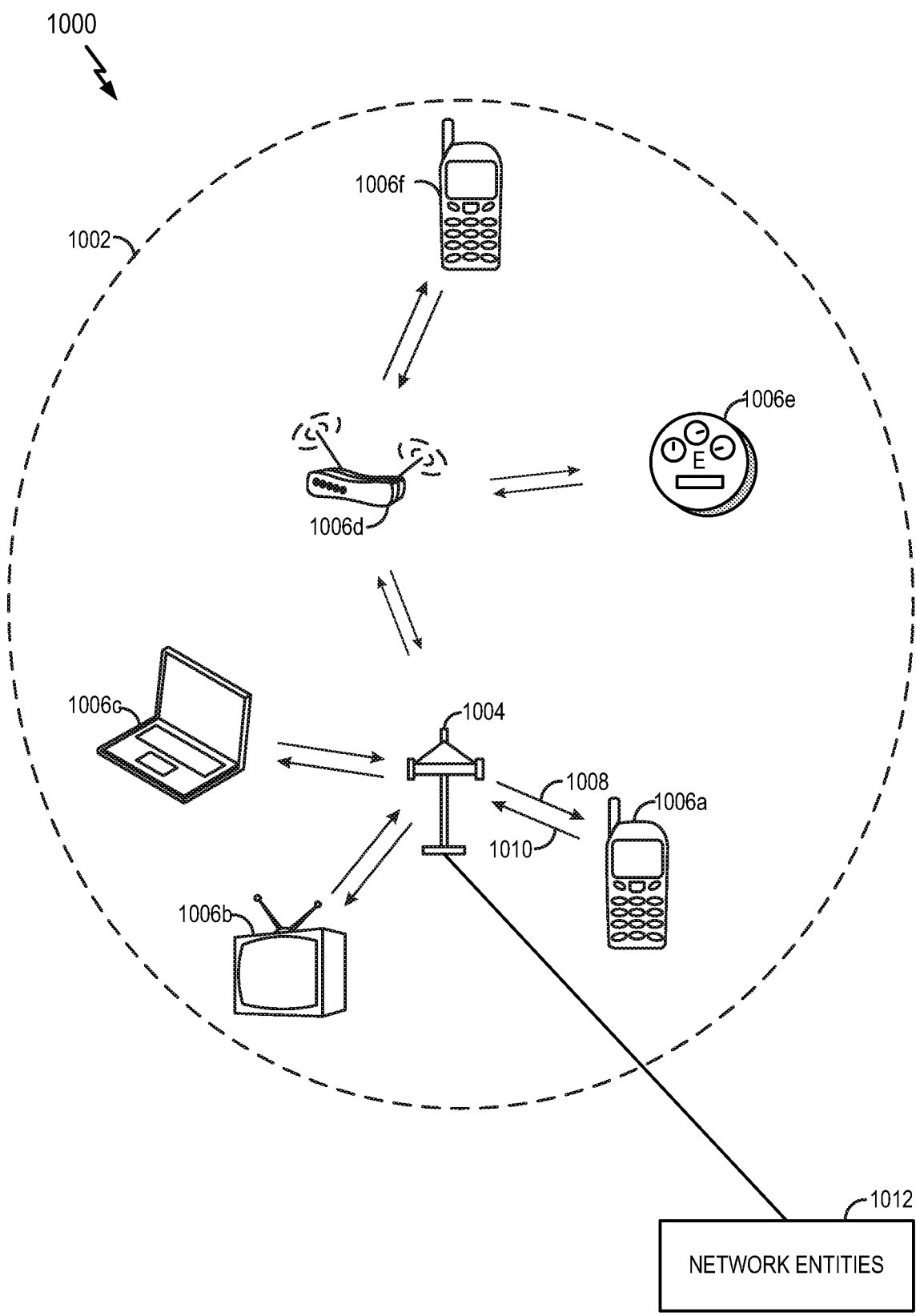
FIG. 10 illustrates another example of a wireless communication system in which aspects of the present disclosure may be employed.

FIG. 10 illustrates an example of a wireless communication system 1000 in which aspects of the present disclosure may be employed. The wireless communication system 1000 may operate pursuant to a wireless standard, for example the 802.11 standard. The wireless communication system 1000 may include an AP 1004, which communicates with STAs 1006a, 1006b, 1006c, 1006d, 1006e, and 1006f (collectively STAs 1006).

STAs 1006e and 1006f may have difficulty communicating with the AP 1004 or may be out of range and unable to communicate with the AP 1004. As such, another STA 1006d may be configured as a relay device (e.g., a device including STA and AP functionality) that relays communication between the AP 1004 and the STAs 1006e and 1006f.

A variety of processes and methods may be used for transmissions in the wireless communication system 1000 between the AP 1004 and the STAs 1006. For example, signals may be sent and received between the AP 1004 and the STAs 1006 in accordance with OFDM/OFDMA techniques. If this is the case, the wireless communication system 1000 may be referred to as an OFDM/OFDMA system. Alternatively, signals may be sent and received between the AP 1004 and the STAs 1006 in accordance with CDMA techniques. If this is the case, the wireless communication system 1000 may be referred to as a CDMA system.

A communication link that facilitates transmission from the AP 1004 to one or more of the STAs 1006 may be referred to as a downlink (DL) 1008, and a communication link that facilitates transmission from one or more of the STAs 1006 to the AP 1004 may be referred to as an uplink (UL) 1010. Alternatively, a downlink 1008 may be referred to as a forward link or a forward channel, and an uplink 1010 may be referred to as a reverse link or a reverse channel.

The AP 1004 may act as a base station and provide wireless communication coverage in a basic service area (BSA) 1002. The AP 1004 along with the STAs 1006 associated with the AP 1004 and that use the AP 1004 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 1004 or to some other access point in the network (not shown).

Each of the access points may communicate with one or more network entities (represented, for convenience, by network entities 1012 in FIG. 10), including each other, to facilitate wide area network connectivity. A network entity may take various forms such as, for example, one or more radio and/or core network entities. Thus, in various implementations the network entities 1012 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 1000 might not have a central AP (e.g., the AP 1004), but rather may function as a peer-to-peer network between the STAs 1006. Accordingly, the functions of the AP 1004 described herein may alternatively be performed by one or more of the STAs 1006. Also, as mentioned above, a relay may incorporate at least some of the functionality of an AP and a STA.

Figure 11:
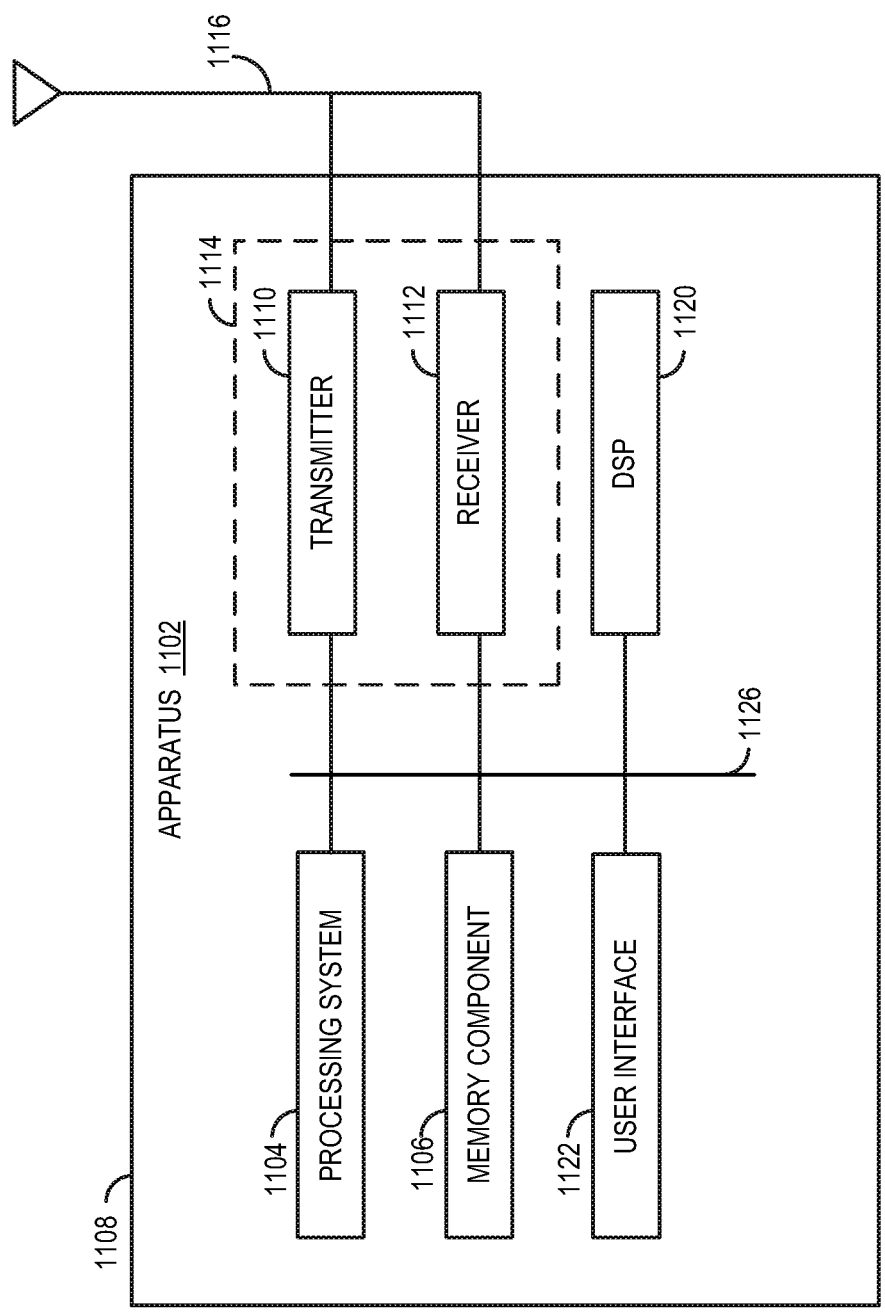
FIG. 11 is a functional block diagram of an example apparatus that may be employed within a wireless communication system in accordance with some aspects of the disclosure.

FIG. 11 illustrates various components that may be utilized in an apparatus 1102 (e.g., a wireless device) that may be employed within the wireless communication system 1000. The apparatus 1102 is an example of a device that may be configured to implement the various methods described herein. For example, the apparatus 1102 may include (e.g., may be) the AP 1004, a relay (e.g., the STA 1006d), or one of the STAs 1006 of FIG. 10.

The apparatus 1102 may include a processing system 1104 that controls operation of the apparatus 1102. The processing system 1104 may also be referred to as a central processing unit (CPU). A memory component 1106 (e.g., including a memory device), which may include both read-only memory (ROM) and random access memory (RAM), provides instructions and data to the processing system 1104. A portion of the memory component 1106 may also include non-volatile random access memory (NVRAM). The processing system 1104 typically performs logical and arithmetic operations based on program instructions stored within the memory component 1106. The instructions in the memory component 1106 may be executable to implement the methods described herein.

When the apparatus 1102 is implemented or used as a transmitting node, the processing system 1104 may be configured to select one of a plurality of media access control (MAC) header types, and to generate a packet having that MAC header type. For example, the processing system 1104 may be configured to generate a packet including a MAC header and a payload and to determine what type of MAC header to use.

When the apparatus 1102 is implemented or used as a receiving node, the processing system 1104 may be configured to process packets of a plurality of different MAC header types. For example, the processing system 1104 may be configured to determine the type of MAC header used in a packet and process the packet and/or fields of the MAC header.

The processing system 1104 may include or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1102 may also include a housing 1108 that may include a transmitter 1110 and a receiver 1112 to allow transmission and reception of data between the apparatus 1102 and a remote location. The transmitter 1110 and receiver 1112 may be combined into single communication device (e.g., a transceiver 1114). An antenna 1116 may be attached to the housing 1108 and electrically coupled to the transceiver 1114. The apparatus 1102 may also include (not shown) multiple transmitters, multiple receivers, multiple transceivers, and/or multiple antennas. A transmitter 1110 and a receiver 1112 may include an integrated device (e.g., embodied as a transmitter circuit and a receiver circuit of a single communication device) in some implementations, may include a separate transmitter device and a separate receiver device in some implementations, or may be embodied in other ways in other implementations.

The transmitter 1110 may be configured to wirelessly transmit packets having different MAC header types. For example, the transmitter 1110 may be configured to transmit packets with different types of headers generated by the processing system 1104, discussed above.

The receiver 1112 may be configured to wirelessly receive packets having different MAC header type. In some aspects, the receiver 1112 is configured to detect a type of a MAC header used and process the packet accordingly.

The receiver 1112 may be used to detect and quantify the level of signals received by the transceiver 1114. The receiver 1112 may detect such signals as total energy, energy per subcarrier per symbol, power spectral density and other signals. The apparatus 1102 may also include a digital signal processor (DSP) 1120 for use in processing signals. The DSP 1120 may be configured to generate a data unit for transmission. In some aspects, the data unit may include a physical layer data unit (PPDU). In some aspects, the PPDU is referred to as a packet.

The apparatus 1102 may further include a user interface 1122 in some aspects. The user interface 1122 may include a keypad, a microphone, a speaker, and/or a display. The user interface 1122 may include any element or component that conveys information to a user of the apparatus 1102 and/or receives input from the user.

The various components of the apparatus 1102 may be coupled together by a bus system 1126. The bus system 1126 may include a data bus, for example, as well as a power bus, a control signal bus, and a status signal bus in addition to the data bus. Those of skill in the art will appreciate the components of the apparatus 1102 may be coupled together or accept or provide inputs to each other using some other mechanism.

Although a number of separate components are illustrated in FIG. 11, one or more of the components may be combined or commonly implemented. For example, the processing system 1104 may be used to implement not only the functionality described above with respect to the processing system 1104, but also to implement the functionality described above with respect to the transceiver 1114 and/or the DSP 1120. Further, each of the components illustrated in FIG. 11 may be implemented using a plurality of separate elements. Furthermore, the processing system 1104 may be used to implement any of the components, modules, circuits, or the like described below, or each may be implemented using a plurality of separate elements.

For ease of reference, when the apparatus 1102 is configured as a transmitting node, it is hereinafter referred to as an apparatus 1102t. Similarly, when the apparatus 1102 is configured as a receiving node, it is hereinafter referred to as an apparatus 1102r. A device in the wireless communication system 1000 may implement only functionality of a transmitting node, only functionality of a receiving node, or functionality of both a transmitting node and a receive node.

As discussed above, the apparatus 1102 may be implemented as an AP 1004 or a STA 1006, and may be used to transmit and/or receive communication having a plurality of MAC header types.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 11 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 12:
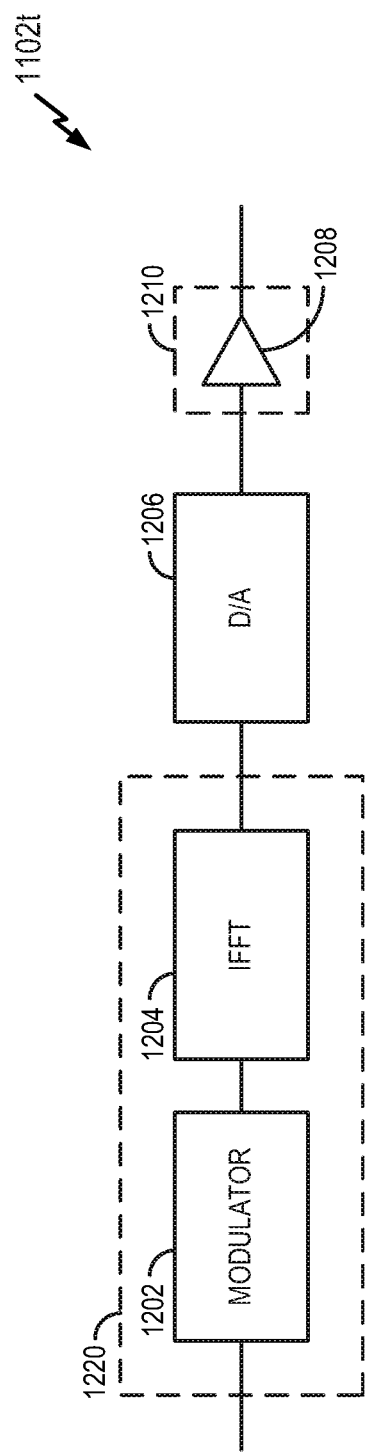
FIG. 12 is a functional block diagram of example components that may be utilized in the apparatus of FIG. 11 to transmit wireless communication.

As discussed above, the apparatus 1102 may be implemented as an AP 1004 or a STA 1006, a relay, or some other type of apparatus, and may be used to transmit and/or receive communication. FIG. 12 illustrates various components that may be utilized in the apparatus 1102t to transmit wireless communication. The components illustrated in FIG. 12 may be used, for example, to transmit OFDM communication. In some aspects, the components illustrated in FIG. 12 are used to generate and transmit packets to be sent over a bandwidth of less than or equal to 1 MHz.

The apparatus 1102t of FIG. 12 may include a modulator 1202 configured to modulate bits for transmission. For example, the modulator 1202 may determine a plurality of symbols from bits received from the processing system 1104 (FIG. 11) or the user interface 1122 (FIG. 11), for example by mapping bits to a plurality of symbols according to a constellation. The bits may correspond to user data or to control information. In some aspects, the bits are received in codewords. In one aspect, the modulator 1202 may include a QAM (quadrature amplitude modulation) modulator, for example, a 16-QAM modulator or a 64-QAM modulator. In other aspects, the modulator 1202 may include a binary phase-shift keying (BPSK) modulator, a quadrature phase-shift keying (QPSK) modulator, or an 8-PSK modulator.

The apparatus 1102t may further include a transform module 1204 configured to convert symbols or otherwise modulated bits from the modulator 1202 into a time domain. In FIG. 12, the transform module 1204 is illustrated as being implemented by an inverse fast Fourier transform (IFFT) module. In some implementations, there may be multiple transform modules (not shown) that transform units of data of different sizes. In some implementations, the transform module 1204 may be itself configured to transform units of data of different sizes. For example, the transform module 1204 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1204 may be referred to as the size of the transform module 1204.

In FIG. 12, the modulator 1202 and the transform module 1204 are illustrated as being implemented in the DSP 1220. In some aspects, however, one or both of the modulator 1202 and the transform module 1204 are implemented in the processing system 1104 or in another element of the apparatus 1102t (e.g., see description above with reference to FIG. 11).

As discussed above, the DSP 1220 may be configured to generate a data unit for transmission. In some aspects, the modulator 1202 and the transform module 1204 may be configured to generate a data unit including a plurality of fields including control information and a plurality of data symbols.

Returning to the description of FIG. 12, the apparatus 1102t may further include a digital to analog converter 1206 configured to convert the output of the transform module into an analog signal. For example, the time-domain output of the transform module 1204 may be converted to a baseband OFDM signal by the digital to analog converter 1206. The digital to analog converter 1206 may be implemented in the processing system 1104 or in another element of the apparatus 1102 of FIG. 11. In some aspects, the digital to analog converter 1206 is implemented in the transceiver 1114 (FIG. 11) or in a data transmit processor.

The analog signal may be wirelessly transmitted by the transmitter 1210. The analog signal may be further processed before being transmitted by the transmitter 1210, for example by being filtered or by being upconverted to an intermediate or carrier frequency. In the aspect illustrated in FIG. 12, the transmitter 1210 includes a transmit amplifier 1208. Prior to being transmitted, the analog signal may be amplified by the transmit amplifier 1208. In some aspects, the amplifier 1208 may include a low noise amplifier (LNA).

The transmitter 1210 is configured to transmit one or more packets or data units in a wireless signal based on the analog signal. The data units may be generated using the processing system 1104 (FIG. 11) and/or the DSP 1220, for example using the modulator 1202 and the transform module 1204 as discussed above. Data units that may be generated and transmitted as discussed above are described in additional detail below.

Figure 13:
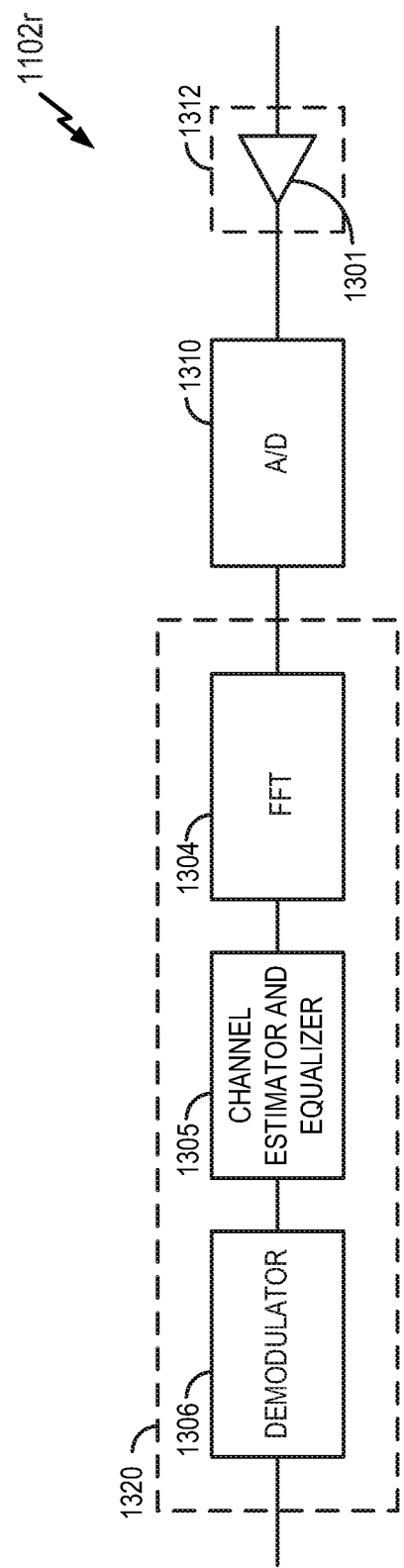
FIG. 13 is a functional block diagram of example components that may be utilized in the apparatus of FIG. 11 to receive wireless communication.

FIG. 13 illustrates various components that may be utilized in the apparatus 1102 of FIG. 11 to receive wireless communication. The components illustrated in FIG. 13 may be used, for example, to receive OFDM communication. For example, the components illustrated in FIG. 13 may be used to receive data units transmitted by the components discussed above with respect to FIG. 12.

The receiver 1312 of apparatus 1102r is configured to receive one or more packets or data units in a wireless signal. Data units that may be received and decoded or otherwise processed as discussed below.

In the aspect illustrated in FIG. 13, the receiver 1312 includes a receive amplifier 1301. The receive amplifier 1301 may be configured to amplify the wireless signal received by the receiver 1312. In some aspects, the receiver 1312 is configured to adjust the gain of the receive amplifier 1301 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1301 may include an LNA.

The apparatus 1102r may include an analog to digital converter 1310 configured to convert the amplified wireless signal from the receiver 1312 into a digital representation thereof. Further to being amplified, the wireless signal may be processed before being converted by the analog to digital converter 1310, for example by being filtered or by being downconverted to an intermediate or baseband frequency. The analog to digital converter 1310 may be implemented in the processing system 1104 (FIG. 11) or in another element of the apparatus 1102r. In some aspects, the analog to digital converter 1310 is implemented in the transceiver 1114 (FIG. 11) or in a data receive processor.

The apparatus 1102r may further include a transform module 1304 configured to convert the representation of the wireless signal into a frequency spectrum. In FIG. 13, the transform module 1304 is illustrated as being implemented by a fast Fourier transform (FFT) module. In some aspects, the transform module may identify a symbol for each point that it uses. As described above with reference to FIG. 12, the transform module 1304 may be configured with a plurality of modes, and may use a different number of points to convert the signal in each mode. The number of points used by the transform module 1304 may be referred to as the size of the transform module 1304. In some aspects, the transform module 1304 may identify a symbol for each point that it uses.

The apparatus 1102r may further include a channel estimator and equalizer 1305 configured to form an estimate of the channel over which the data unit is received, and to remove certain effects of the channel based on the channel estimate. For example, the channel estimator and equalizer 1305 may be configured to approximate a function of the channel, and the channel equalizer may be configured to apply an inverse of that function to the data in the frequency spectrum.

The apparatus 1102r may further include a demodulator 1306 configured to demodulate the equalized data. For example, the demodulator 1306 may determine a plurality of bits from symbols output by the transform module 1304 and the channel estimator and equalizer 1305, for example by reversing a mapping of bits to a symbol in a constellation. The bits may be processed or evaluated by the processing system 1104 (FIG. 11), or used to display or otherwise output information to the user interface 1122 (FIG. 11). In this way, data and/or information may be decoded. In some aspects, the bits correspond to codewords. In one aspect, the demodulator 1306 may include a QAM (quadrature amplitude modulation) demodulator, for example an 8-QAM demodulator or a 64-QAM demodulator. In other aspects, the demodulator 1306 may include a binary phase-shift keying (BPSK) demodulator or a quadrature phase-shift keying (QPSK) demodulator.

In FIG. 13, the transform module 1304, the channel estimator and equalizer 1305, and the demodulator 1306 are illustrated as being implemented in the DSP 1320. In some aspects, however, one or more of the transform module 1304, the channel estimator and equalizer 1305, and the demodulator 1306 are implemented in the processing system 1104 (FIG. 11) or in another element of the apparatus 1102 (FIG. 11).

As discussed above, the wireless signal received at the receiver 1112 may include one or more data units. Using the functions or components described above, the data units or data symbols therein may be decoded evaluated or otherwise evaluated or processed. For example, the processing system 1104 (FIG. 11) and/or the DSP 1320 may be used to decode data symbols in the data units using the transform module 1304, the channel estimator and equalizer 1305, and the demodulator 1306.

Data units exchanged by the AP 1004 and the STA 1006 may include control information or data, as discussed above. At the physical (PHY) layer, these data units may be referred to as physical layer protocol data units (PPDUs). In some aspects, a PPDU may be referred to as a packet or physical layer packet. Each PPDU may include a preamble and a payload. The preamble may include training fields and a SIG field. The payload may include a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1102*t* shown in FIG. 12 is an example of a single transmit chain used for transmitting via an antenna. The apparatus 1102*r* shown in FIG. 13 is an example of a single receive chain used for receiving via an antenna. In some implementations, the apparatus 1102*t* or 1102*r* may implement a portion of a MIMO system using multiple antennas to simultaneously transmit data.

The wireless communication system 1000 may employ methods to allow efficient access of the wireless medium based on unpredictable data transmissions while avoiding collisions. As such, in accordance with various aspects, the wireless communication system 1000 performs carrier sense multiple access/collision avoidance (CSMA/CA) that may be referred to as the Distributed Coordination Function (DCF). More generally, an apparatus 1102 having data for transmission senses the wireless medium to determine if the channel is already occupied. If the apparatus 1102 senses the channel is idle, then the apparatus 1102 transmits prepared data. Otherwise, the apparatus 1102 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus may include a user interface configured to output an indication based on a received signal as taught herein.

Example Communication Device

Figure 14:
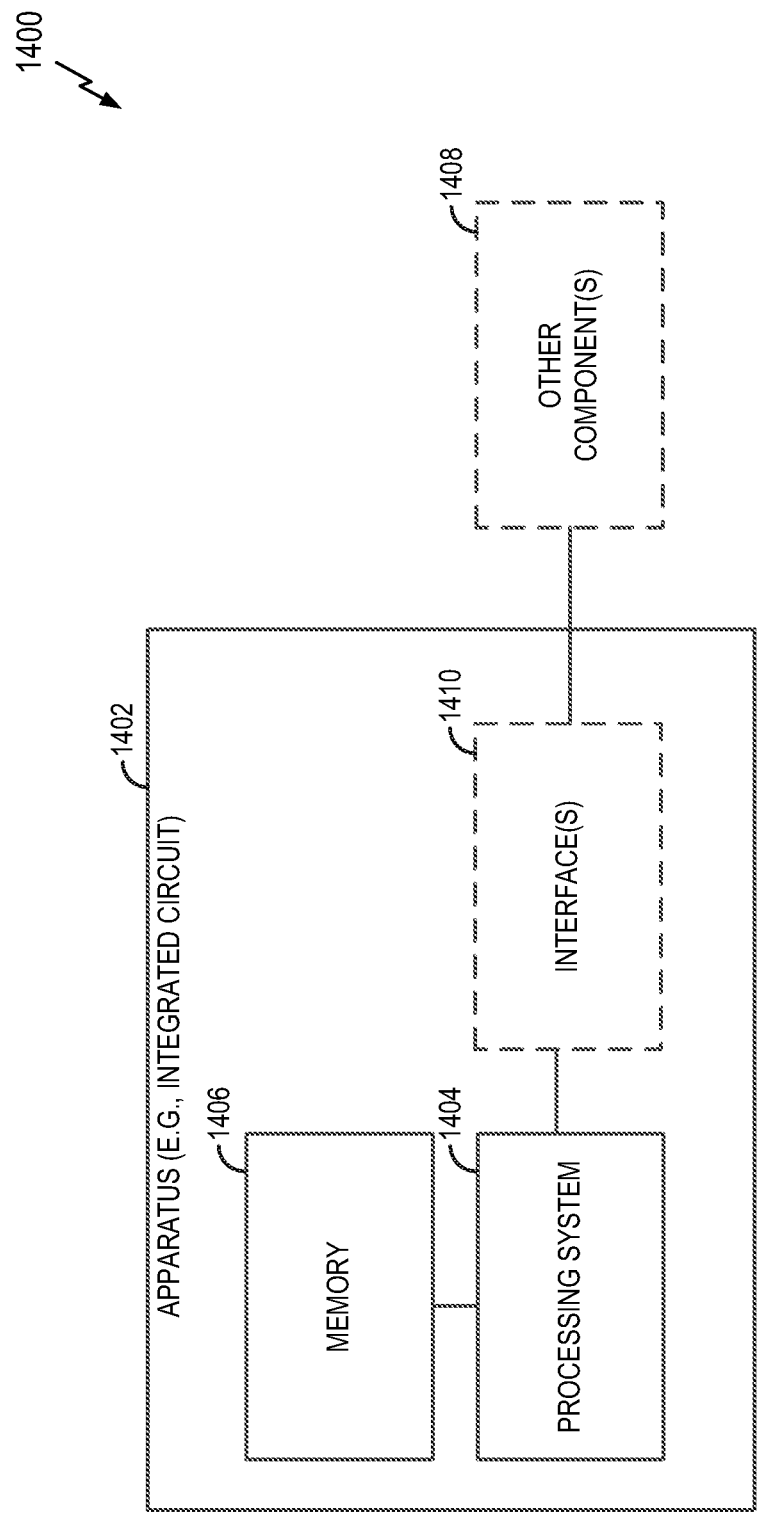
FIG. 14 is a functional block diagram of an example apparatus in accordance with some aspects of the disclosure.

FIG. 14 illustrates an example apparatus 1400 (e.g., an AP, an AT, or some other type of wireless communication node) according to certain aspects of the disclosure. The apparatus 1400 includes an apparatus 1402 (e.g., an integrated circuit) and, optionally, at least one other component 1408. In some aspects, the apparatus 1402 may be configured to operate in a wireless communication node (e.g., an AP or an AT) and to perform one or more of the operations described herein. For convenience, a wireless communication node may be referred to herein as a wireless node. The apparatus 1402 includes a processing system 1404, and a memory 1406 coupled to the processing system 1404. Example implementations of the processing system 1404 are provided herein. In some aspects, the processing system 1404 and the memory 1406 of FIG. 14 may correspond to the processing system 1104 and the memory component 1106 of FIG. 11.

The processing system 1404 is generally adapted for processing, including the execution of such programming stored on the memory 1406. For example, the memory 1406 may store instructions that, when executed by the processing system 1404, cause the processing system 1404 to perform one or more of the operations described herein. As used herein, the terms "programming" or "instructions" or "code" shall be construed broadly to include without limitation instruction sets, instructions, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some implementations, the apparatus 1402 communicates with at least one other component (e.g., a component 1408 external to the apparatus 1402) of the apparatus 1400. To this end, in some implementations, the apparatus 1402 may include at least one interface 1410 (e.g., a send/receive interface) coupled to the processing system 1404 for outputting and/or obtaining (e.g., sending and/or receiving) information (e.g., received information, generated information, decoded information, messages, etc.) between the processing system 1404 and the at least one other component 1408. In some implementations, the at least one interface 1410 may include an interface bus, bus drivers, bus receivers, other suitable circuitry, or a combination thereof. In some implementations, the at least one interface 1410 may include radio frequency (RF) circuitry (e.g., an RF transmitter and/or an RF receiver). In some implementations, the at least one interface 1410 may be configured to interface the apparatus 1402 to one or more other components of the apparatus 1400 (other components not shown in FIG. 14). For example, the at least one interface 1410 may be configured to interface the processing system 1404 to a radio frequency (RF) front end (e.g., an RF transmitter and/or am RF receiver).

The apparatus 1402 may communicate with other apparatuses in various ways. In cases where the apparatus 1402 includes an RF transceiver (not shown in FIG. 14), the apparatus may transmit and receive information (e.g., a frame, a message, bits, etc.) via RF signaling. In some cases, rather than transmitting information via RF signaling, the apparatus 1402 may have an interface to provide (e.g., output, send, transmit, etc.) information for RF transmission. For example, the processing system 1404 may output information, via a bus interface, to an RF front end for RF transmission. Similarly, rather than receiving information via RF signaling, the apparatus 1402 may have an interface to obtain information that is received by another apparatus. For example, the processing system 1404 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

Example Processes

Figure 15:
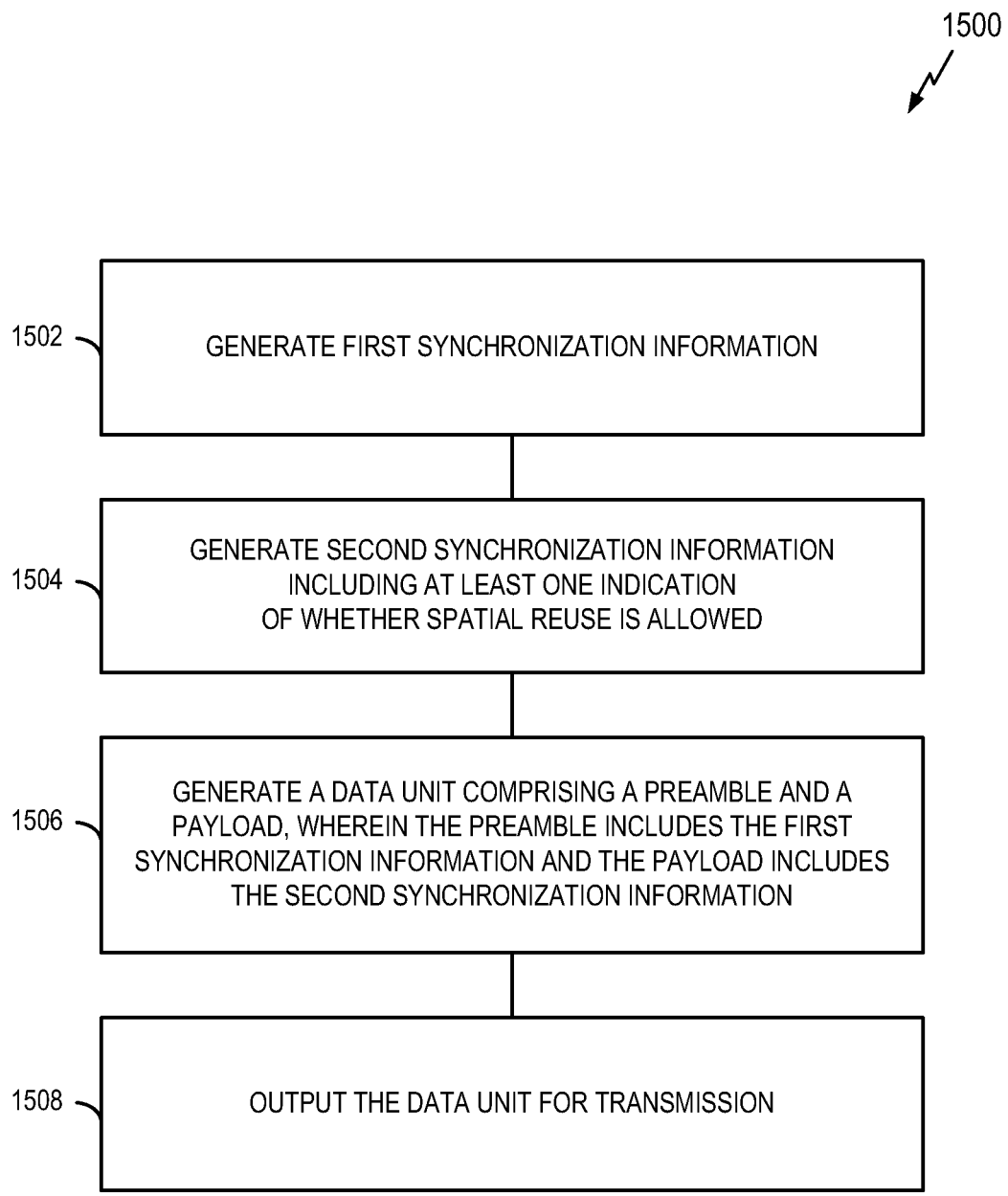
FIG. 15 is a flow diagram of an example process in accordance with some aspects of the disclosure.

FIG. 15 illustrates a process 1500 for communication in accordance with some aspects of the disclosure. The process 1500 may take place within a processing system (e.g., the processing system 1404 of FIG. 14), which may be located in an AP, a STA, or some other suitable apparatus. Of course, in various aspects within the scope of the disclosure, the process 1500 may be implemented by any suitable apparatus capable of supporting communication-related operations.

At block 1502, an apparatus (e.g., a chip or a transmitting wireless node) generates first synchronization information. For example, the apparatus may generate synchronization symbols and/or at least one training field.

At block 1504, the apparatus generates second synchronization information including at least one indication of whether spatial reuse is allowed. For example, the apparatus may generate synchronization symbols and/or at least one training field, and also determine whether spatial reuse is allowed (e.g., based on channel conditions, a configurable parameter, or some other means).

At block 1506, the apparatus generates a data unit including a preamble and a payload, wherein the preamble may include the first synchronization information and the payload may include the second synchronization information. In some aspects, the data unit may include an IEEE 802.11ax frame. In some aspects, the data unit may include an IEEE 802.11ac frame. In some aspects, the data unit may include a Physical Layer Convergence Protocol (PLCP) Protocol Data Unit.

At block 1508, the apparatus outputs the data unit for transmission. For example, a processing system of the apparatus may output a digital signal including the data unit to an interface (e.g., a send interface), a transceiver, or some other component. As another example, an interface may send a digital signal including the data unit to a transceiver.

In some aspects, the second synchronization information may include a plurality of synchronization symbols. In some aspects, the at least one indication may include (e.g., may be) a plurality of indications. In some aspects, each of the plurality of synchronization symbols may include a respective one of the plurality of indications. In some aspects, the payload may further include a plurality of data symbols; and the generation of the data unit may include placing at least one of the data symbols between the synchronization symbols in the payload.

In some aspects, the second synchronization information may include at least one indication of whether spatial reuse is allowed. In some aspects, the second synchronization information may include a plurality of indications of whether spatial reuse is allowed.

In some aspects, the second synchronization information may include at least one indication of a duration of the data unit. In some aspects, the second synchronization information may include a plurality of indications of a duration of the data unit.

In some aspects, the second synchronization information may include: a first training field, a second training field, an indication of a duration of the data unit, a basis service set (BSS) indication, or any combination thereof. In some aspects, the first training field may include a synchronization sequence; the second training field may include a channel estimation sequence; or the first training field may include a synchronization sequence and the second training field may include a channel estimation sequence. In some aspects, the first training field may include an IEEE 802.11 short training field; the second training field may include an IEEE 802.11 long training field; or the first training field may include an IEEE 802.11 short training field and the second training field may include an IEEE 802.11 long training field. In some aspects, the indication of a duration may include: an indication of time; or an indication of a quantity of information bits. In some aspects, the BSS indication may include an IEEE 802.11 BSS color.

In some aspects, the second synchronization information may include: an indication of whether spatial reuse is allowed, guard interval information, a synchronization symbol identifier, or any combination thereof.

In some aspects, the payload may further include a plurality of data symbols. In some aspects, the generation of the data unit may include: encoding at least a portion of the second synchronization information with the data symbols. In some aspects, the portion of the second synchronization information may include the at least one indication. In some aspects, the portion of the second synchronization information may include: an indication of a duration of the data unit, a basis service set (BSS) indication, an indication of whether spatial reuse is allowed, guard interval information, a synchronization symbol identifier, or any combination thereof. In some aspects, the generation of the data unit may include: encoding the data symbols using a particular modulation and coding scheme (MCS); and encoding at least a portion of the second synchronization information using the particular MCS. In some aspects, the second synchronization information may include a first portion and a second portion; and the generation of the data unit may include: encoding the data symbols, and encoding only the second portion of the second synchronization information. In some aspects, the first portion of the second synchronization information may include at least one training field.

In some aspects, a process as taught herein may include any combination of the above features.

Figure 16:
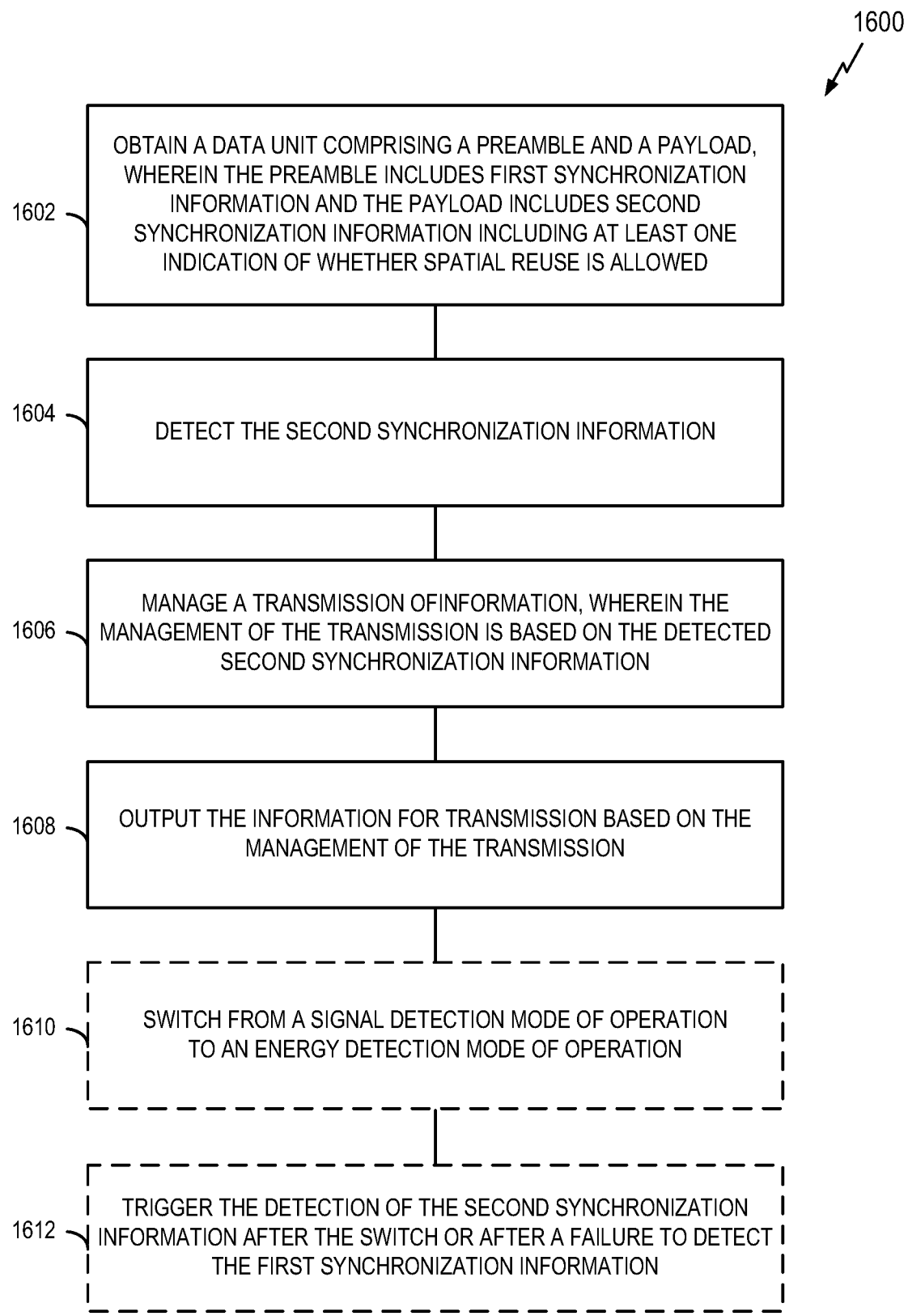
FIG. 16 is a flow diagram of an example process in accordance with some aspects of the disclosure.

FIG. 16 illustrates a process 1600 for communication in accordance with some aspects of the disclosure. The process 1600 may take place within a processing system (e.g., the processing system 1404 of FIG. 14), which may be located in a STA, an AP, or some other suitable apparatus. Of course, in various aspects within the scope of the disclosure, the process 1600 may be implemented by any suitable apparatus capable of supporting communication-related operations.

At block 1602, an apparatus (e.g., a chip of a receiving wireless node) obtains a data unit including a preamble and a payload, wherein the preamble may include first synchronization information and the payload may include second synchronization information including at least one indication of whether spatial reuse is allowed. For example, a processing system of the apparatus may receive a digital signal including the data unit from an interface (e.g., a receive interface), a receiver, a transceiver, or some other component. As another example, an interface may receive a digital signal including the data unit from a receiver or a transceiver. As yet another example, a receiver may receive a signal (e.g., an RF signal) including the data unit. In some aspects, the data unit may include an IEEE 802.11ax frame. In some aspects, the data unit may include an IEEE 802.11ac frame. In some aspects, the data unit may include a Physical Layer Convergence Protocol (PLCP) Protocol Data Unit.

At block 1604, the apparatus detects the second synchronization information. For example, the apparatus may perform operations as described above in conjunction with FIG. 5.

At block 1606, the apparatus manages a transmission of information, wherein the management of the transmission is based on the detected second synchronization information. For example, the apparatus may determine whether to transmit. As another example, the apparatus may determine how to transmit.

At block 1608, the apparatus outputs the information for transmission based on the management of the transmission. For example, a processing system of the apparatus may output a digital signal including the information to an interface (e.g., a send interface), a transceiver, or some other component. As another example, an interface may send a digital signal including the information to a transceiver.

At optional block 1610, the apparatus may switch from a signal detection mode to an energy detection mode. For example, the apparatus may turn off an SD module and turn on an ED module.

At optional block 1612, the apparatus may trigger the detection of the second synchronization information after the switch of block 1610 or after a failure to detect the first synchronization information. For example, the apparatus may initiate the detection operations described above in conjunction with FIG. 5 in response to one or both of these trigger conditions.

In some aspects, the management of the transmission may include determining that the at least one indication indicates that spatial reuse is allowed and allowing spatial reuse for the transmission of the information as a result of the determination; and the outputting of the information for transmission may include outputting the information according to the spatial reuse. In some aspects, the management of the transmission may include allowing spatial reuse for the transmission of the information if the detected second synchronization information may include an indication that spatial reuse is allowed; and the outputting of the information for transmission may include outputting the information according to the spatial reuse.

In some aspects, the detected second synchronization information may include at least one indication of a duration of the data unit; the management of the transmission may include determining a duration for the transmission of the information based the at least one indication of a duration of the data unit; and the outputting of the information for transmission may include outputting the information according to the determined duration. In some aspects, the detected second synchronization information may include at least one indication of a duration of the data unit; and the management of the transmission may include determining a period of time to defer the transmission based the at least one indication of a duration of the data unit.

In some aspects, the process may further include triggering the detection of the second synchronization information after a failure to detect the first synchronization information. In some aspects, the process may further include switching from a signal detection mode of operation to an energy detection mode of operation; and triggering the detection of the second synchronization information after the switching.

In some aspects, the second synchronization information may include a plurality of synchronization symbols. In some aspects, the at least one indication may include (e.g., may be) a plurality of indications. In some aspects, each of the plurality of synchronization symbols may include a respective one of the plurality of indications.

In some aspects, the payload may further include a plurality of data symbols. Here, at least one of the data symbols may be located between the synchronization symbols in the payload.

In some aspects, the second synchronization information may include at least one indication of whether spatial reuse is allowed. In some aspects, the second synchronization information may include a plurality of indications of whether spatial reuse is allowed. In some aspects, the second synchronization information may include at least one indication of a duration of the data unit. In some aspects, the second synchronization information may include a plurality of indications of a duration of the data unit.

In some aspects, the second synchronization information may include: a first training field, a second training field, an indication of a duration of the data unit, a basis service set (BSS) indication, or any combination thereof. In some aspects, the first training field may include a synchronization sequence; the second training field may include a channel estimation sequence; or the first training field may include a synchronization sequence and the second training field may include a channel estimation sequence. In some aspects, the first training field may include an IEEE 802.11 short training field; the second training field may include an IEEE 802.11 long training field; or the first training field may include an IEEE 802.11 short training field and the second training field may include an IEEE 802.11 long training field. In some aspects, the indication of a duration may include: an indication of time; or an indication of a quantity of information bits. In some aspects, the BSS indication may include an IEEE 802.11 BSS color.

In some aspects, the second synchronization information may include: an indication of whether spatial reuse is allowed, guard interval information, a synchronization symbol identifier, or any combination thereof.

In some aspects, the payload may further include a plurality of data symbols. In some aspects, the detection of the second synchronization information may include: decoding a portion of the second synchronization information with the data symbols. In some aspects, the portion of the second synchronization information may include the at least one indication. In some aspects, the portion of the second synchronization information may include: an indication of a duration of the data unit, a basis service set (BSS) indication, an indication of whether spatial reuse is allowed, guard interval information, a synchronization symbol identifier, or any combination thereof. In some aspects, the detection of the second synchronization information may include: decoding the data symbols according to a particular modulation and coding scheme (MCS); and decoding a portion of the second synchronization information according to the particular MCS. In some aspects, the second synchronization information may include a first portion and a second portion; and the detection of the second synchronization information may include: decoding the data symbols, and decoding only the second portion of the second synchronization information. In some aspects, the first portion of the second synchronization information may include at least one training field.

In some aspects, a process as taught herein may include any combination of the above features.

Example Apparatus

Figure 17:
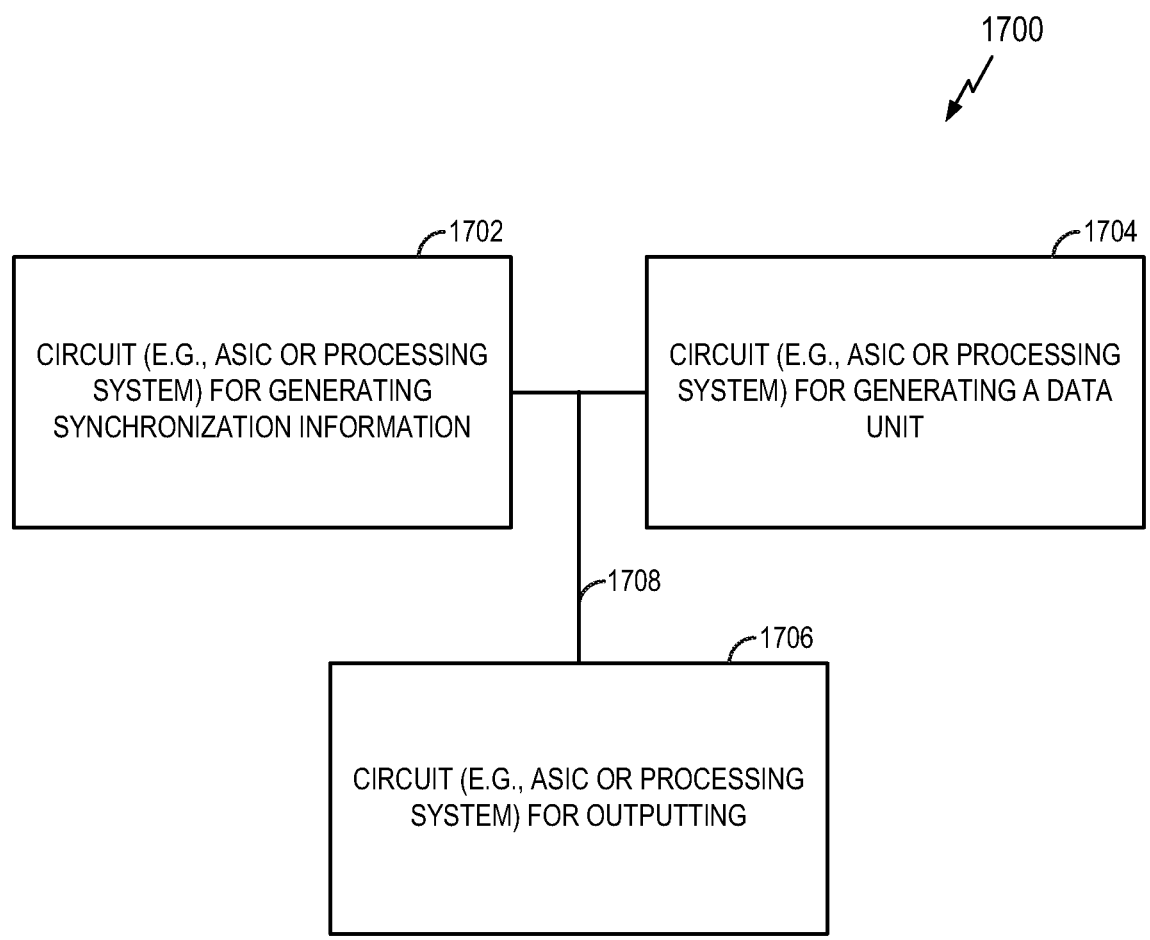
FIG. 17 is a simplified block diagram of several sample aspects of an apparatus configured with functionality in accordance with some aspects of the disclosure.
Figure 18:
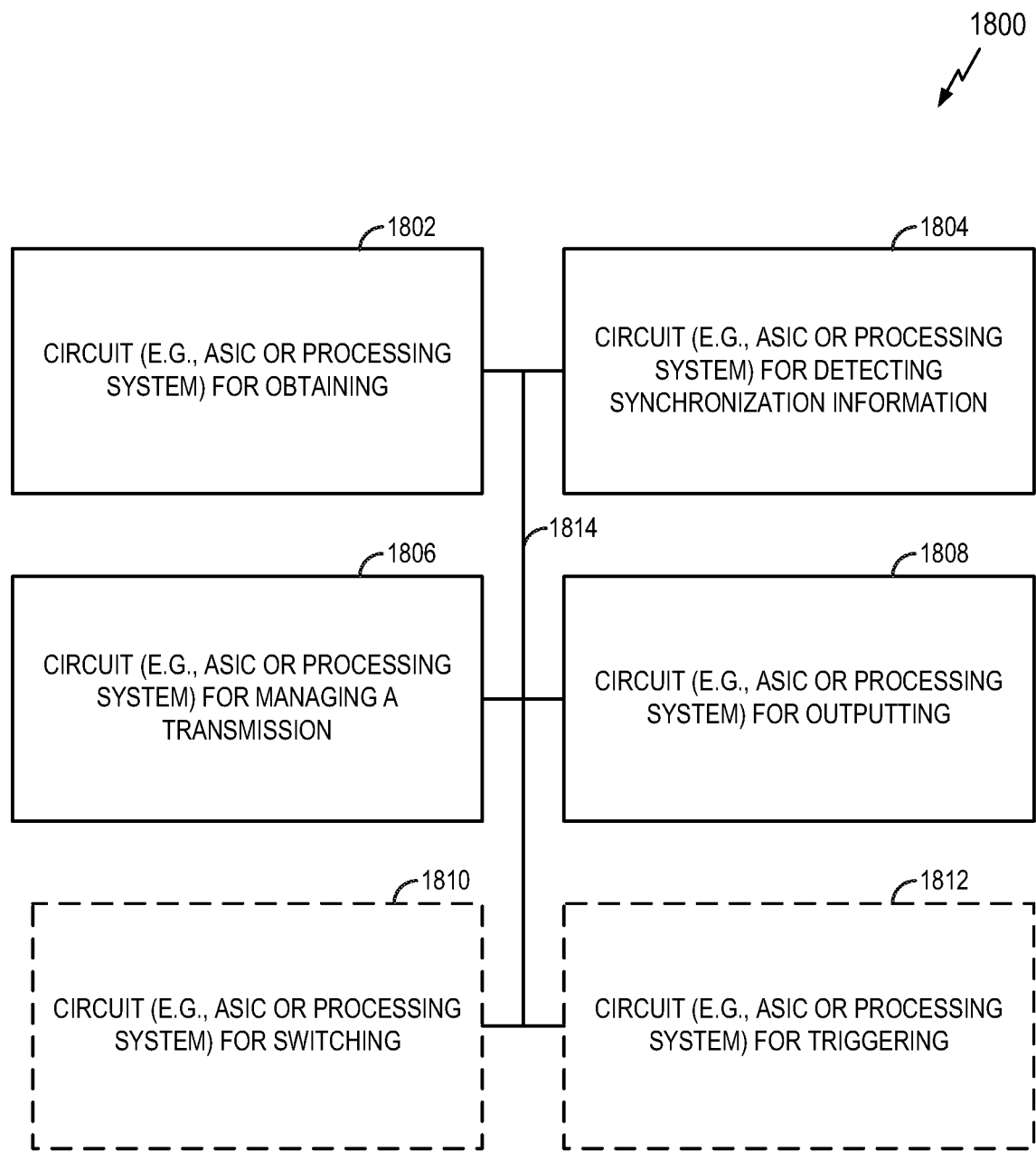
FIG. 18 is a simplified block diagram of several sample aspects of an apparatus configured with functionality in accordance with some aspects of the disclosure.

The components described herein may be implemented in a variety of ways. Referring to FIGS. 17 and 18, an apparatus 1700 and an apparatus 1800 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 1700 includes one or more components (modules) that may perform one or more of the functions described herein with regard to various figures. For example, a circuit (e.g., an ASIC or processing system) for generating synchronization information 1702, e.g., a means for generating synchronization information, may correspond to, for example, a processing system as discussed herein. A circuit (e.g., an ASIC or processing system) for generating a data unit 1704 (e.g., a means for generating a data unit), may correspond to, for example, a processing system as discussed herein. A circuit (e.g., an ASIC or processing system) for outputting 1706, e.g., a means for outputting, may correspond to, for example, an interface (e.g., a bus interface, a send/receive interface, or some other type of signal interface), a communication device, a transceiver, a transmitter, or some other similar component as discussed herein. Two or more of the modules of FIG. 17 may communicate with each other or some other component via a signaling bus 1708. In various implementations, the processing system 1104 of FIG. 11 and/or the processing system 1404 of FIG. 14 may include one or more of the circuit for generating synchronization information 1702, the circuit for generating a data unit 1704, or the circuit for outputting 1706.

The apparatus 1800 includes one or more components (modules) that may perform one or more of the functions described herein with regard to various figures. For example, a circuit (e.g., an ASIC or processing system) for obtaining 1802, e.g., a means for obtaining, may correspond to, for example, an interface (e.g., a bus interface, a send/receive interface, or some other type of signal interface), a communication device, a transceiver, a receiver, or some other similar component as discussed herein. A circuit (e.g., an ASIC or processing system) for detecting synchronization information 1804, e.g., a means for detecting synchronization information, may correspond to, for example, a processing system as discussed herein. A circuit (e.g., an ASIC or processing system) for managing a transmission 1806, e.g., a means for managing a transmission, may correspond to, for example, a processing system as discussed herein. A circuit (e.g., an ASIC or processing system) for outputting 1808, e.g., a means for outputting, may correspond to, for example, an interface (e.g., a bus interface, a send/receive interface, or some other type of signal interface), a communication device, a transceiver, a transmitter, or some other similar component as discussed herein. A circuit (e.g., an ASIC or processing system) for switching 1810, e.g., a means for switching, may correspond to, for example, a processing system as discussed herein. A circuit (e.g., an ASIC or processing system) for triggering 1812, e.g., a means for triggering, may correspond to, for example, a processing system as discussed herein. Two or more of the modules of FIG. 18 may communicate with each other or some other component via a signaling bus 1814. In various implementations, the processing system 1104 of FIG. 11 and/or the processing system 1404 of FIG. 14 may include one or more of the circuit for obtaining 1802, the circuit for detecting synchronization information 1804, the circuit for managing a transmission 1806, the circuit for outputting 1808, the circuit for switching 1810, or the circuit for triggering 1812.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes herein are optional.

As noted above, the apparatus 1700 and the apparatus 1800 may take the form of or may be implemented in one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1700 may be a single device (e.g., with the circuit for generating synchronization information 1702, the circuit for generating a data unit 1704, and the circuit for outputting 1706 implemented as different sections of an ASIC). As another specific example, the apparatus 1700 may be several devices (e.g., with the circuit for generating synchronization information 1702 and the circuit for generating a data unit 1704 implemented as one ASIC, and the circuit for outputting 1706 implemented as another ASIC).

In addition, the components and functions represented by FIGS. 17 and 18 as well as other components and functions described herein, may be implemented using any suitable means. Such means are implemented, at least in part, using corresponding structure as taught herein. For example, the components described above in conjunction with the "ASIC for" components of FIGS. 17 and 18 correspond to similarly designated "means for" functionality. Thus, one or more of such means is implemented using one or more of processor components, integrated circuits, or other suitable structure as taught herein in some implementations.

The various operations of methods described herein may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar functionality and/or numbering. For example, the blocks of the process 1500 illustrated in FIG. 15 may correspond at least in some aspects, to corresponding blocks of the apparatus 1700 illustrated in FIG. 17. As another example, the blocks of the process 1600 illustrated in FIG. 16 may correspond at least in some aspects, to corresponding blocks of the apparatus 1800 illustrated in FIG. 18.

Example Programming

Figure 19:
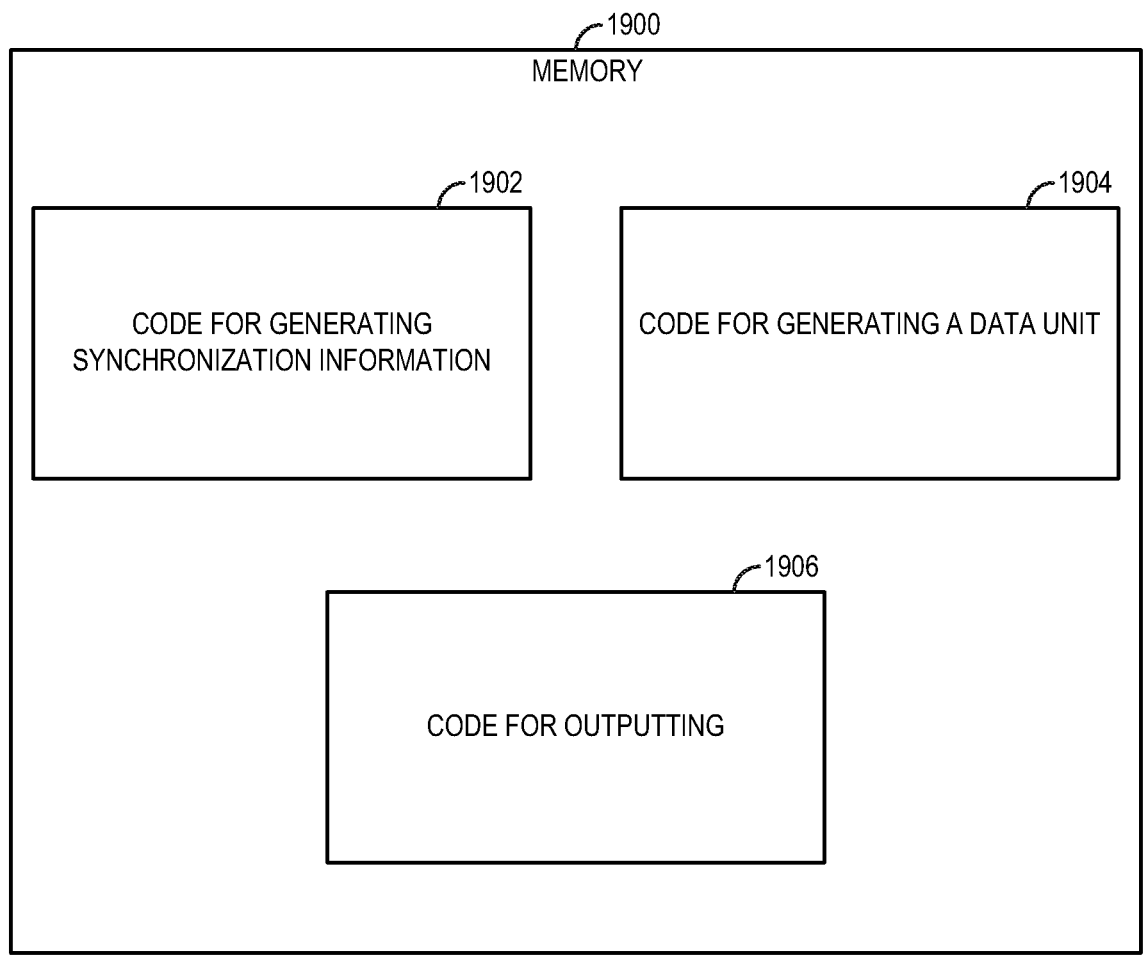
FIG. 19 is a simplified block diagram of several sample aspects of a memory configured with code in accordance with some aspects of the disclosure.
Figure 20:
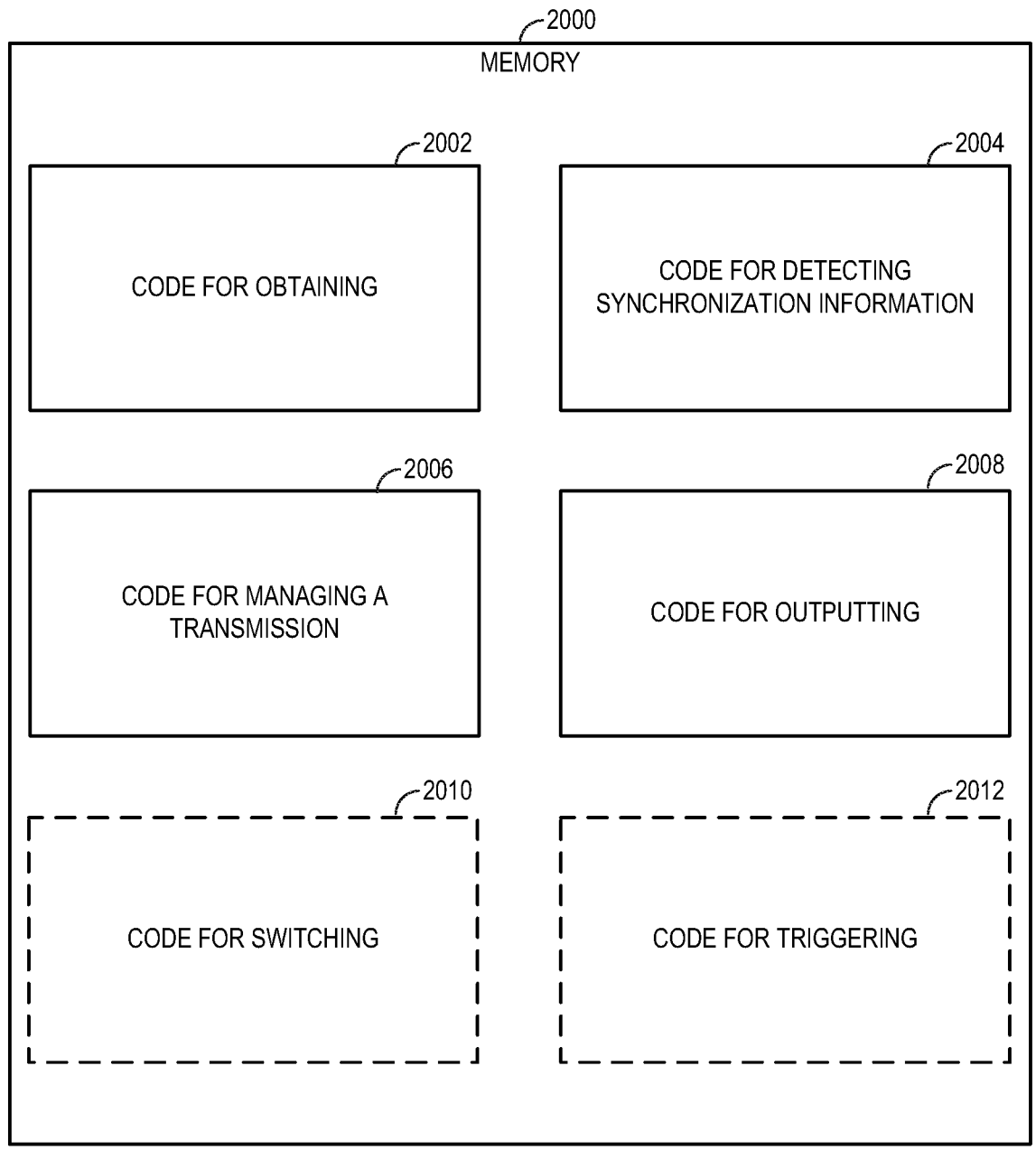
FIG. 20 is a simplified block diagram of several sample aspects of a memory configured with code in accordance with some aspects of the disclosure.

Referring to FIGS. 19 and 20, programming stored by the memory 1900 or 2000 (e.g. a storage medium, a memory device, etc.), when executed by a processing system (e.g., the processing system 1404 of FIG. 14), causes the processing system to perform one or more of the various functions and/or process operations described herein. For example, the programming, when executed by the processing system 1404, may cause the processing system 1404 to perform the various functions, steps, and/or processes described herein with respect to FIGS. 1-8, and 14-18 in various implementations. As shown in FIG. 19, the memory 1900 may include one or more of code for generating 1902 or code for outputting 1904. In some aspects, one of more of the code for generating synchronization information 1902, code for generating a data unit 1904, or code for outputting 1906 may be executed or otherwise used to provide the functionality described herein for FIG. 17. As shown in FIG. 20, the memory 2000 may include one or more of code for obtaining 2002, code for detecting synchronization information 2004, code for managing a transmission 2006, code for outputting 2008, code for switching 2010, or code for triggering 2012. In some aspects, one of more of the code for obtaining 2002, the code for detecting synchronization information 2004, the code for managing a transmission 2006, the code for outputting 2008, the code for switching 2010, or the code for triggering 2012 may be executed or otherwise used to provide the functionality described herein for FIG. 18. In some aspects, the memory 1900 or the memory 2000 may correspond to the memory 1406 of FIG. 14.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. An apparatus for communication, comprising:
a processing system configured to:
generate first synchronization information for a station, wherein the first synchronization information comprises a first training field and first signal information, and wherein the first training field includes a training sequence,
generate second synchronization information for the station comprising a second training field including the training sequence of the first training field, wherein the second synchronization information further comprises second signal information including at least a portion of the first signal information, and
generate a data unit comprising a preamble and a payload that follows the preamble, wherein the preamble includes the first synchronization information and the payload includes the second synchronization information and a plurality of data symbols, wherein the first signal information of the preamble and the second signal information of the payload both comprise a first indication of a duration of the data unit, or the first signal information of the preamble and the second signal information of the payload both comprise a second indication of whether spatial reuse is allowed, or the first signal information of the preamble and the second signal information of the payload both comprise a first basic service set (BSS) color indication; and
an interface configured to output the data unit for transmission to the station.

2. The apparatus of claim 1, wherein:
the second synchronization information comprises a first synchronization symbol and a second synchronization symbol;
the first synchronization symbol includes the first indication; and
the second synchronization symbol includes the second indication.

3. The apparatus of claim 1, wherein the second synchronization information includes: guard interval information, a synchronization symbol identifier, or any combination thereof.

4. The apparatus of claim 1, wherein the generation of the data unit comprises:
encoding at least a portion of the second synchronization information with the data symbols.

5. The apparatus of claim 4, wherein the portion of the second synchronization information comprises the second indication.

6. The apparatus of claim 1, wherein the generation of the data unit comprises:
encoding the data symbols using a particular modulation and coding scheme (MCS); and
encoding at least a portion of the second synchronization information using the particular MCS.

7. The apparatus of claim 1, wherein:
the second synchronization information comprises a first portion and a second portion; and
the generation of the data unit comprises:
encoding the data symbols,
encoding the second portion of the second synchronization information; and
abstaining from encoding the first portion of the second synchronization information.

8. A wireless node, comprising:
a processing system configured to:
generate first synchronization information for a station, wherein the first synchronization information comprises a first training field and first signal information, and wherein the first training field includes a training sequence, generate second synchronization information for the station comprising a second training field including the training sequence of the first training field, wherein the second synchronization information further comprises second signal information including at least a portion of the first signal information, and generate a data unit comprising a preamble and a payload that follows the preamble, wherein the preamble includes the first synchronization information and the payload includes the second synchronization information and a plurality of data symbols, wherein the first signal information of the preamble and the second signal information of the payload both comprise a first indication of a duration of the data unit, or the first signal information of the preamble and the second signal information of the payload both comprise a second indication of whether spatial reuse is allowed, or the first signal information of the preamble and the second signal information of the payload both comprise a first basic service set (BSS) color indication, or a combination thereof; and a transmitter configured to transmit the data unit to the station.

9. A first apparatus for communication, comprising:

an interface configured to obtain a data unit from a second apparatus comprising a preamble and a payload that follows the preamble, wherein the preamble includes first synchronization information for a third apparatus comprising a first training field and first signal information, wherein the first training field includes a training sequence, and wherein the payload includes a plurality of data symbols and second synchronization information for the third apparatus including at least one indication of whether spatial reuse is allowed, wherein the second synchronization information comprises a second training field including the training sequence of the first training field, wherein the second synchronization information further comprises second signal information including at least a portion of the first signal information; and a processing system configured to:
  detect the second synchronization information in the payload of the data unit after failing to successfully detect the first synchronization information in the preamble of the data unit, and
  manage a transmission of information to a fourth apparatus, wherein the management of the transmission is based on the detected second synchronization information, wherein the interface is further configured to output the information for transmission to the fourth apparatus based on the management of the transmission.

10. The first apparatus of claim 9, wherein:

the management of the transmission comprises determining that the at least one indication indicates that spatial reuse is allowed and allowing spatial reuse for the transmission of the information as a result of the determination; and the interface is further configured to output the information according to the spatial reuse.

11. The first apparatus of claim 9, wherein:

the detected second synchronization information includes at least one indication of a duration of the data unit;

the management of the transmission comprises determining a duration for the transmission of the information based the at least one indication of a duration of the data unit; and the interface is further configured to output the information for transmission according to the determined duration.

12. The first apparatus of claim 9, wherein the processing system is further configured to:

switch from a signal detection mode of operation to an energy detection mode of operation; and trigger the detection of the second synchronization information after the switch.

13. The first apparatus of claim 9, wherein:

the second synchronization information comprises a first synchronization symbol and a second synchronization symbol;

the at least one indication comprises a first indication and a second indication;

the first synchronization symbol includes the first indication; and the second synchronization symbol includes the second indication.

14. The first apparatus of claim 9, wherein the detection of the second synchronization information comprises:

decoding at least a portion of the second synchronization information with the data symbols.

15. The first apparatus of claim 9, wherein the detection of the second synchronization information comprises:

decoding the data symbols according to a particular modulation and coding scheme (MCS); and decoding at least a portion of the second synchronization information according to the particular MCS.

16. The first apparatus of claim 9, further comprising:

a receiver configured to receive the data unit; and a transmitter configured to transmit the information, wherein the first apparatus is configured as a wireless node.

17. The first apparatus of claim 9, wherein the first signal information of the preamble and the second signal information of the payload both comprise at least one of a first indication of a duration of the data unit, a second indication of whether spatial reuse is allowed, a first basic service set (BSS) color indication, or a combination thereof.

* * * * *